(12) United States Patent
Olivera et al.

(10) Patent No.: US 7,461,825 B2
(45) Date of Patent: Dec. 9, 2008

(54) TRAY SUPPORT ARM ASSEMBLY

(75) Inventors: Argelio Olivera, Mission Viejo, CA (US); David Weston, Newport Beach, CA (US); Andrew M. Hahn, Anaheim, CA (US)

(73) Assignee: Alcon, Inc., Hunenberg (CH)

( * ) Notice: Subject to any disclaimer, the term of this patent is extended or adjusted under 35 U.S.C. 154(b) by 0 days.

(21) Appl. No.: 11/522,649

(22) Filed: Sep. 18, 2006

(65) Prior Publication Data

US 2008/0067302 A1 Mar. 20, 2008

(51) Int. Cl.
*E04G 3/00* (2006.01)

(52) U.S. Cl. .............................. 248/282.1; 248/123.11; 248/123.2; 248/124.1; 248/183.1; 312/209; 312/223.1; 312/223.2

(58) Field of Classification Search ............ 248/123.11, 248/123.2, 124.1, 125.7, 280.11, 282.1, 292.11, 248/276.1, 584, 183.1; 606/19; 312/209, 312/223.1, 223.2

See application file for complete search history.

(56) References Cited

U.S. PATENT DOCUMENTS

| | | | | | |
|---|---|---|---|---|---|
| 2,933,803 | A | * | 4/1960 | Schaeffler | 29/898.067 |
| 3,160,379 | A | * | 12/1964 | Gardella | 248/125.7 |
| 3,366,430 | A | * | 1/1968 | Diedrich | 312/201 |
| 3,436,046 | A | * | 4/1969 | Valeska | 248/284.1 |
| 3,823,906 | A | * | 7/1974 | Rogers | 248/279.1 |
| 3,952,849 | A | * | 4/1976 | Brownhill et al. | 192/41 A |
| 4,695,024 | A | * | 9/1987 | Haven | 248/281.11 |
| 4,836,486 | A | * | 6/1989 | Vossoughi et al. | 248/281.11 |
| 4,844,387 | A | * | 7/1989 | Sorgi et al. | 108/5 |
| 4,913,396 | A | | 4/1990 | Dalebout et al. | |
| 4,989,698 | A | | 2/1991 | Dony | |
| 5,056,866 | A | | 10/1991 | Tobler | |
| 5,070,976 | A | * | 12/1991 | Zlotek | 192/45.1 |
| 5,123,621 | A | * | 6/1992 | Gates | 248/281.11 |
| 5,337,869 | A | * | 8/1994 | Zlotek | 192/45.1 |
| D352,106 | S | | 11/1994 | Fanney et al. | |
| 5,398,622 | A | | 3/1995 | Lubinskas et al. | |
| 5,553,820 | A | * | 9/1996 | Karten et al. | 248/286.1 |
| 5,655,741 | A | * | 8/1997 | Watkins | 248/289.11 |
| 5,820,253 | A | | 10/1998 | Scholz | |
| 5,823,120 | A | | 10/1998 | Holmquist | |
| 6,000,560 | A | * | 12/1999 | Barkan | 211/96 |
| 6,022,088 | A | | 2/2000 | Metzler | |
| 6,076,785 | A | * | 6/2000 | Oddsen, Jr. | 248/118.3 |
| 6,244,779 | B1 | * | 6/2001 | Slasinski | 403/92 |
| D447,567 | S | | 9/2001 | Murphy et al. | |
| D467,001 | S | | 12/2002 | Buczek et al. | |
| 6,626,445 | B2 | | 9/2003 | Murphy et al. | |
| 6,736,360 | B1 | * | 5/2004 | Buczek | 248/276.1 |
| 2004/0195482 | A1 | * | 10/2004 | Kollar et al. | 248/282.1 |

\* cited by examiner

*Primary Examiner*—J. Allen Shriver, II
*Assistant Examiner*—Michael McDuffie
(74) *Attorney, Agent, or Firm*—W. David Lee

(57) ABSTRACT

A tray support arm assembly provides for the positioning of a tray and an attached movable arm in a substantially horizontal orientation with respect to the console portion of a machine for use and a substantially vertical orientation with respect to the console portion of a machine for storage. The tray support arm assembly includes a lockable tray rotation joint, a lockable wrist joint, a lower arm assembly, a lockable elbow joint, an upper assembly and a lockable shoulder joint.

16 Claims, 24 Drawing Sheets

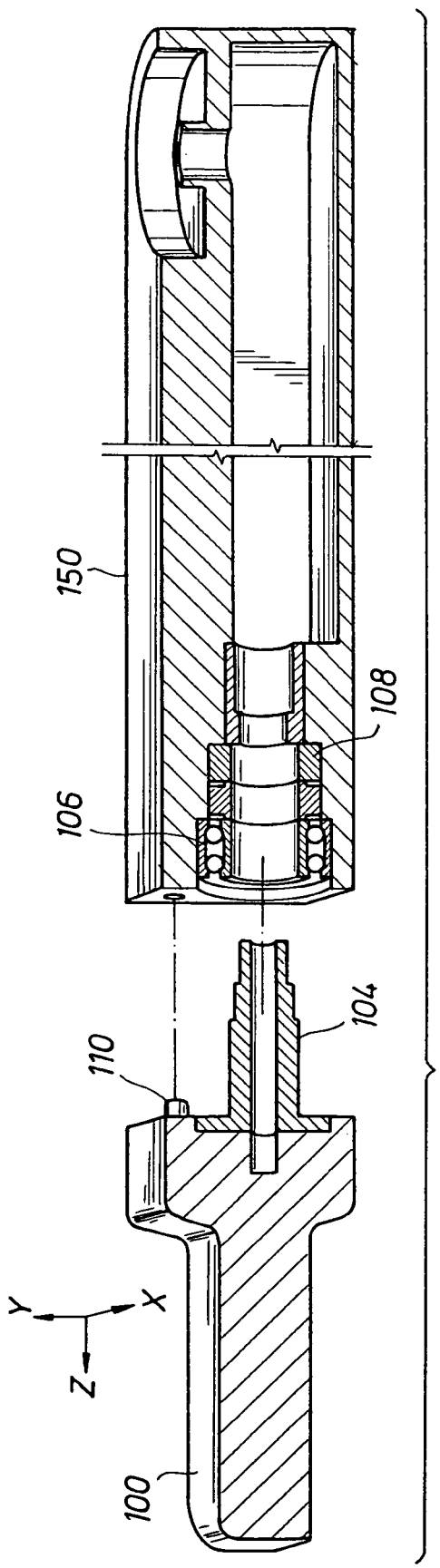
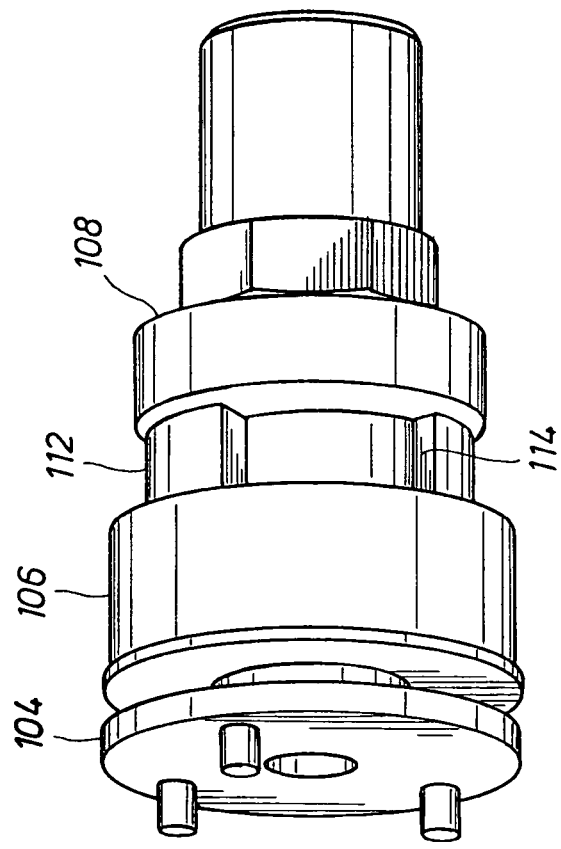
FIG.11
FIG.12

TRAY SUPPORT ARM ASSEMBLY

FIELD

The present invention pertains to tray support arm assemblies; more particularly, the present invention pertains to a stowable tray support arm assembly which is easily positioned to suit the needs of those using a tray supported by the stowable tray support arm assembly for holding instruments, supplies or consumables.

BACKGROUND

In many types of equipment, particularly medical equipment, a health care professional uses an array of instruments to perform delicate procedures, such as surgery, on a patient. These instruments together with certain supplies and consumables are typically placed on a tray located both near the patient and within easy reach of the health care professional. Most people who have ever visited a dentist are familiar with the tray used by a dental hygienist or a dentist when performing either cleaning or more complex dental procedures on teeth. The tray is positioned near the dental patient's mouth so that those items needed to complete a procedure are in easy reach of the health care professional.

Trays such as those used by dentists are also used with other types of equipment to conduct medical procedures such as those conducted in an operating room while a patient may be under anesthesia. One example of such procedures is eye surgery. A medical procedure such as eye surgery requires that the needed instruments, supplies and consumables be placed near the eyes of the patient but also that these instruments, supplies and consumables be within easy reach of the eye surgeon.

During certain types of eye surgery the surgeon typically is positioned over the head of the patient to enable easy access to the eyes of the patient. The surgeon then uses a variety of different instruments, supplies and consumables during the eye surgery procedure. These instruments, supplies and consumables may be placed within easy reach of the surgeon on a stand-alone tray.

In some prior art ophthalmic surgical systems, the trays are supported on separate Mayo stands. Other trays are supported by tray arms whose shoulder mountings are positioned below the side of the surface on which the patient is positioned. Some tray supports may be simply raised and lowered and do not allow for any type of lateral motion.

Accordingly, there remains a need in the art for a tray support system that can be used with a medical device, such as an ophthalmic surgical console, that will allow a tray for instruments, supplies, and consumables to be supported and positioned over the patient and still be within easy reach of a health care professional. The tray support system should be positionable to accommodate patients of all sizes as well as surgeons of all sizes. In addition, the tray support system should be sufficiently movable to be usable by either right handed or left handed health care professionals.

SUMMARY

The disclosed tray support arm assembly, described in terms of its use with an ophthalmic surgical console, allows for instruments, supplies and consumables to be positioned over a patient and also to be placed within easy reach of a health care professional. In addition, the disclosed tray support arm assembly will enable cables and tubes to be held in a position where they are not in the way of health care professionals. Because many different surgical procedures are enabled by an ophthalmic surgical machine, the tray support arm assembly of the present invention further allows the tray to be oriented in a substantially horizontal orientation when in use thereby enabling the tray to be placed in a variety of different positions to accommodate a variety of surgical procedures. For storage, the entire tray support arm assembly may be folded into a substantially vertical orientation and moved to a position alongside the ophthalmic machine console for storage.

Underneath the tray itself is tray rotation joint and a lockable wrist joint. The tray rotation joint allows for turning the tray about a first vertical axis when in use. Connected to the lockable wrist joint is a lower arm assembly. At the opposite end of the lower arm assembly from the wrist joint is a lockable elbow joint. Like the lockable tray rotation joint, the lockable elbow joint provides for turning the lower arm assembly about a (second) vertical axis. Connected to the lockable elbow joint is an upper arm assembly. The upper arm assembly contains a locking gas spring which, in part, bears the weight of the tray and the tray support arm assembly. At the opposite end of the upper arm assembly from the lockable elbow joint is a lockable shoulder joint. Like the lockable tray rotation joint and the lockable elbow joint, the lockable shoulder joint permits rotation about a (third) vertical axis.

For storage, the tray may be rotated about a first horizontal axis with respect to the lower arm assembly via the lockable wrist joint. Further enabling storage is the capability of the shoulder joint to be rotated about a second horizontal axis.

The lockable shoulder joint is typically situated on the ophthalmic surgery console above the level of the patient. Such positioning allows the tray to be positioned over the patient during eye surgery without interfering with the patient or the support surface on which the patient is resting.

If the tray itself is overloaded, an elevation adjustment mechanism will release and return the tray to its previous location when the excess load on the tray has been removed.

All of the three vertical axes and two horizontal axes remain locked unless the user unlocks them. Such unlocking of the vertical axes and the shoulder horizontal axis is easily done by a user by actuating a control handle near the tray. Specifically, by actuating the single control handle, the lockable shoulder joint, the lockable elbow joint, the lockable tray rotation joint and the gas spring are unlocked. Release of the single control handle will lock the tray arm in place.

For prevention of inadvertent dumping of the items on the tray, a separately positioned, mutually exclusive control lock is used to unlock the lockable wrist joint.

The tray arm support assembly of the present invention may be positioned manually or by the use of powered actuators. The locking mechanisms on each of the three vertical axes and two horizontal axes can be entirely mechanical mechanisms, powered by some type of actuator or some combination thereof. Use of an actuator will allow for programmatic control and remote positioning of the tray. Further programmatic control will allow for memorized positions for certain procedures, setups, patients, or operating room personnel—to include surgeons and scrub nurses.

BRIEF DESCRIPTION OF THE DRAWING FIGURES

A still better understanding of the tray support arm assembly of the present invention may be had by reference to the drawing figures described below when read in conjunction with the Description of the Embodiments.

FIG. 11 is a perspective view in partial section of the lockable wrist joint and lower arm assembly;

FIG. 12 is a perspective view of the support for the lockable wrist joint within the lower arm assembly;

DESCRIPTION OF THE EMBODIMENTS

Figure 1:
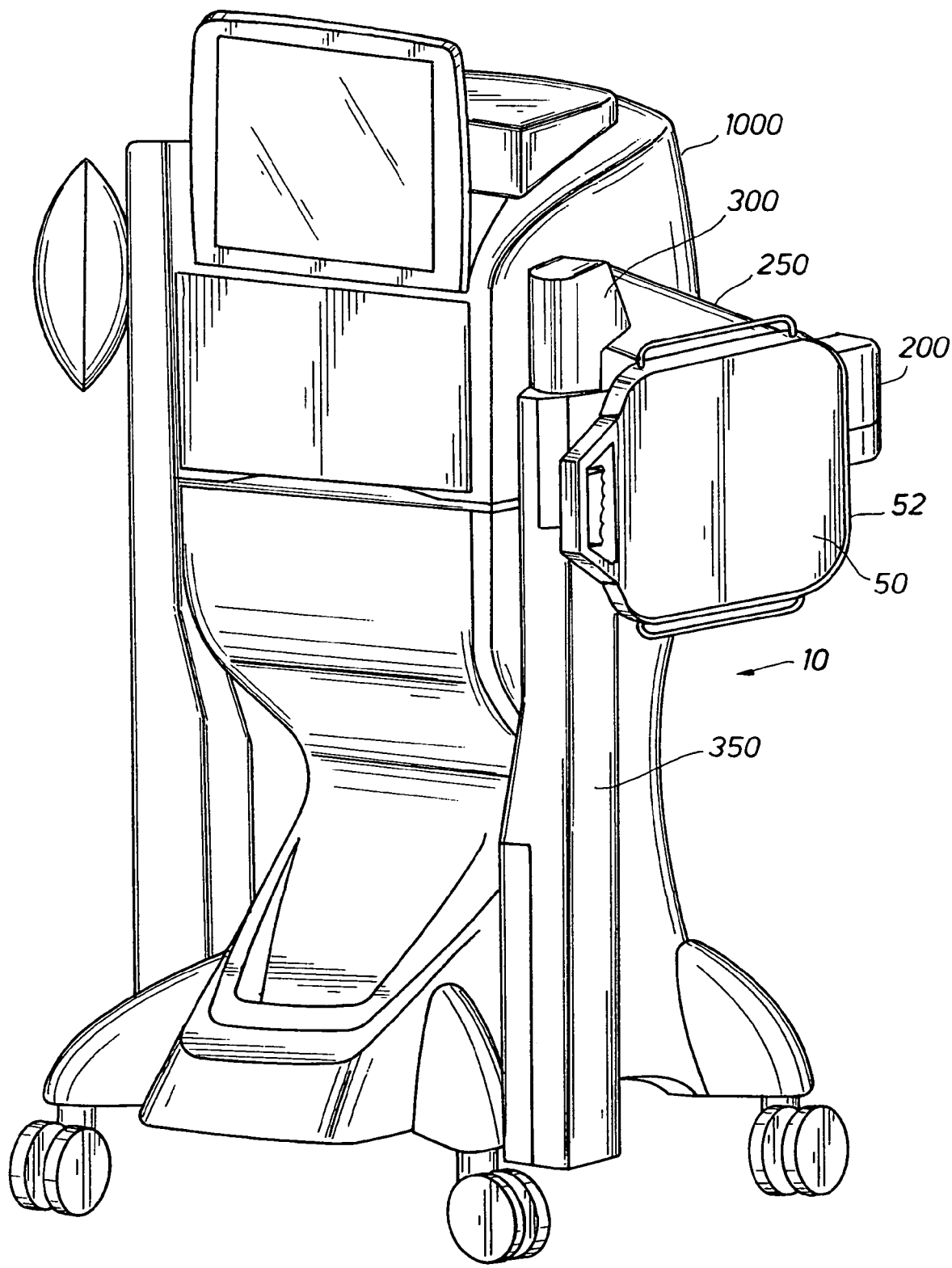
FIG. 1 is a perspective view of an ophthalmic surgical console with the tray support arm assembly of the present invention in its stored configuration.
Figure 2:
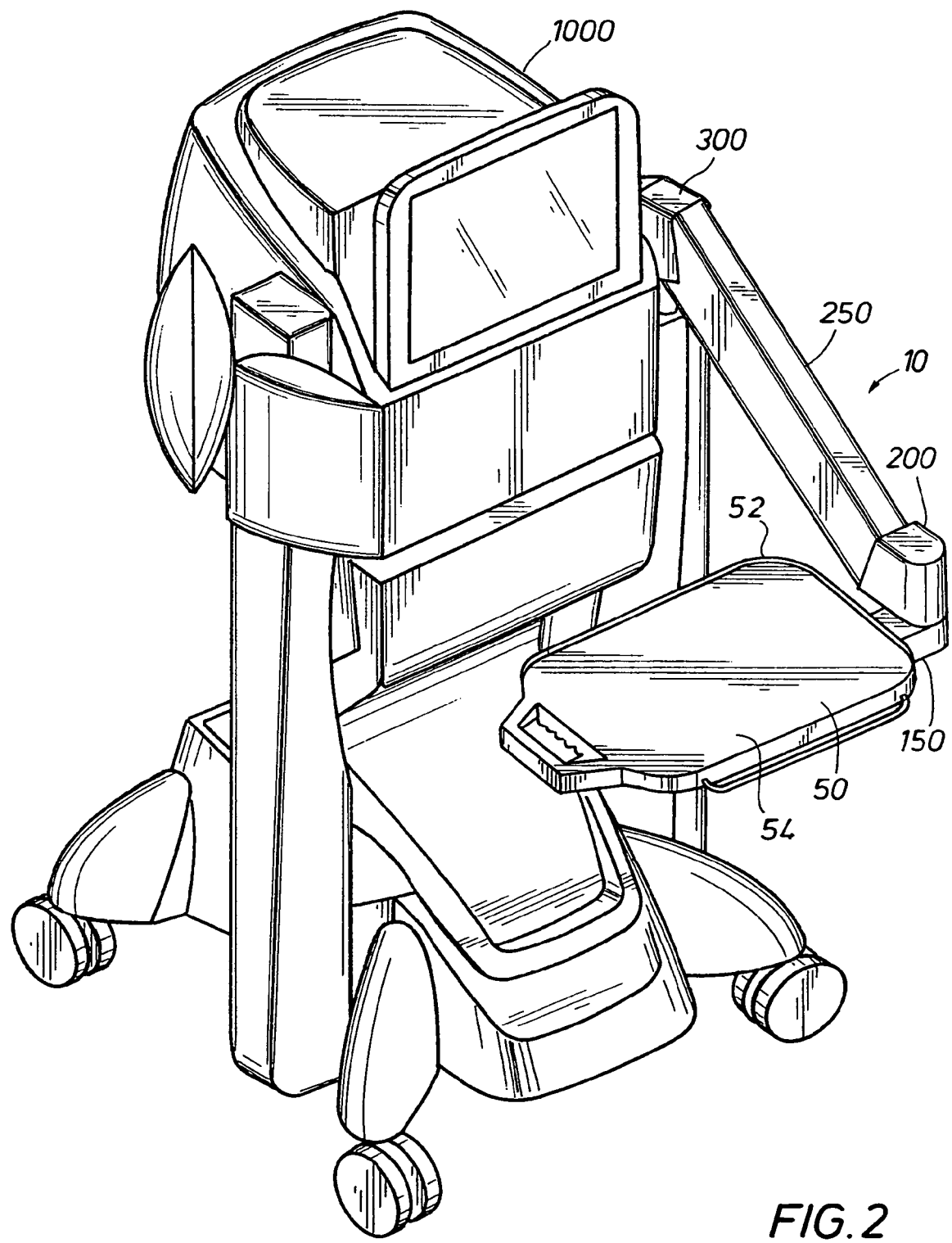
FIG. 2 is a perspective view of the ophthalmic surgical console as shown in FIG. 1 with the tray support arm assembly moved partially away from its stored configuration.
Figure 3:
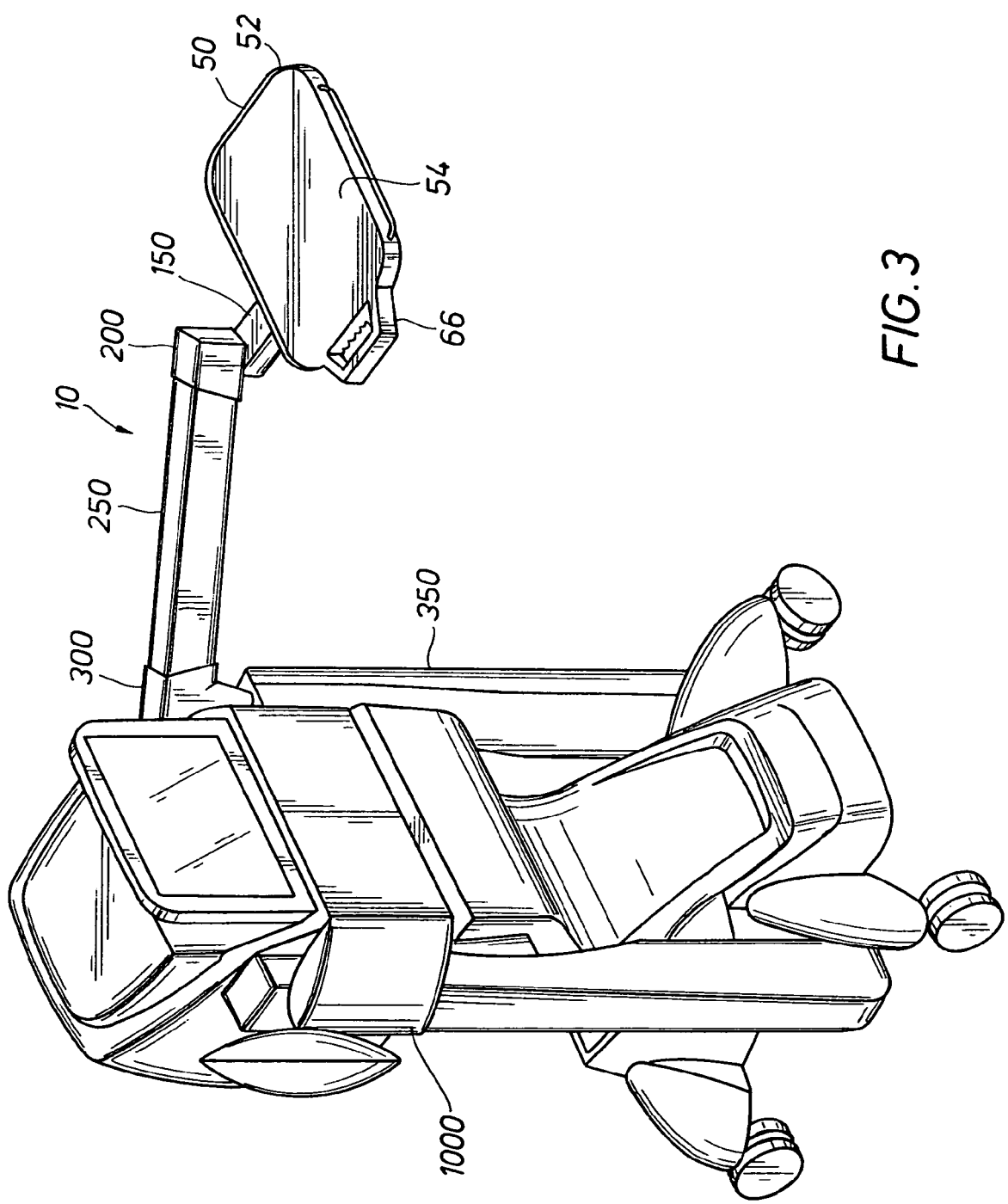
FIG. 3 is a perspective view of the ophthalmic surgical console as shown in FIG. 1 with the tray support arm assembly moved into position for use.

While the disclosed invention is described below in the context of its use with an ophthalmic surgical console 1000, as shown in FIG. 1, FIG. 2, and FIG. 3 those of ordinary skill in the art will understand that the disclosed tray support arm assembly 10 may be used with a variety of other medical equipment. Still others will understand that the disclosed tray support arm assembly 10 is applicable to other non-medical equipment where instruments, supplies or consumables must be used.

Figure 4:
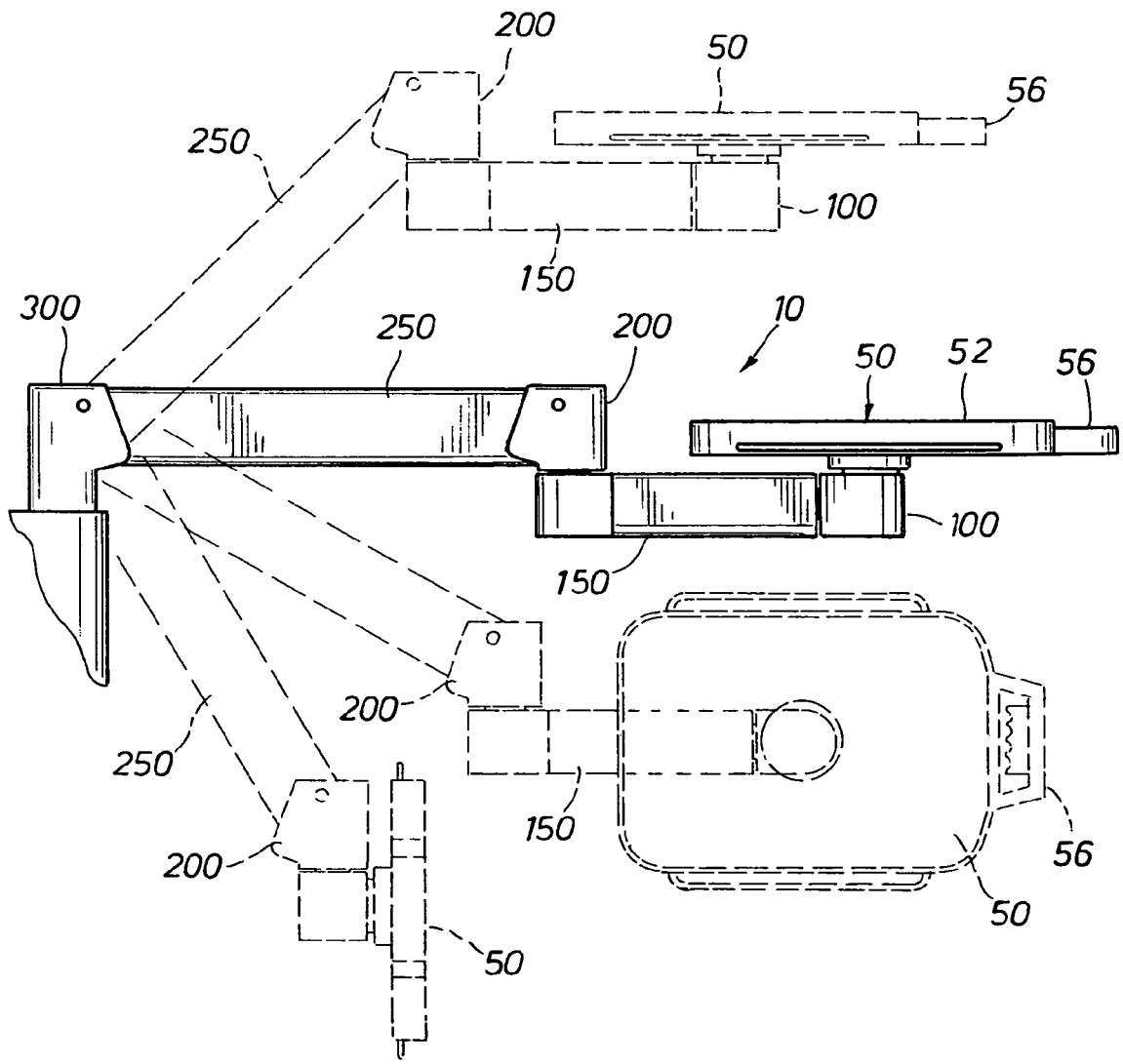
FIG. 4 is a side elevational view of the tray support arm assembly showing its range of positions.
Figure 5:
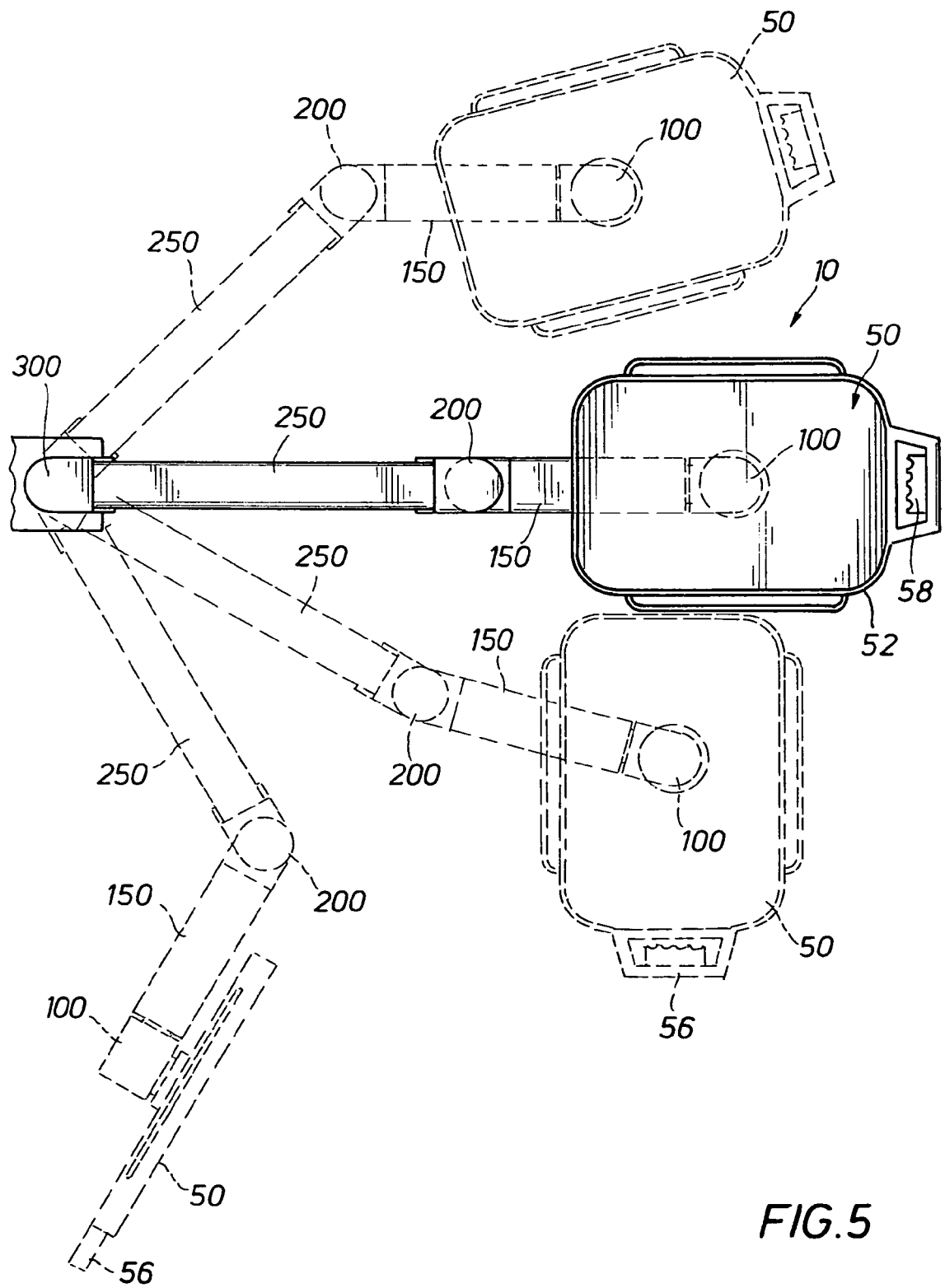
FIG. 5 is a top plan view of the tray support arm assembly showing its range of positions.

The tray support arm assembly 10 is constructed to be an integral part of the ophthalmic surgical surgery console 1000 and can be mounted on either the left side or on the right side of the console 1000. The preferred embodiment of the disclosed tray support arm assembly 10 is entirely mechanical. Use of the disclosed tray support arm assembly 10 provides a useful tray surface 54 with the capacity to hold instruments, equipment and consumables as well as the ability to hold cable and tubes during a surgical procedure. The various joint assemblies within the tray support arm assembly 10 of the present invention provide the needed range of adjustable height and positions as shown in FIG. 4 and FIG. 5 to facilitate a broad array of procedures. The various joint assemblies are designed and constructed for smooth movement between locked positions while at the same time providing a reasonable level of stiffness.

Those of ordinary skill in the art will understand that in an alternate embodiment one or more powered actuators may be used to move the tray support arm assembly 10. Such actuators can be controlled to facilitate programmatic control and remote positioning of the tray assembly 50.

Figure 6:
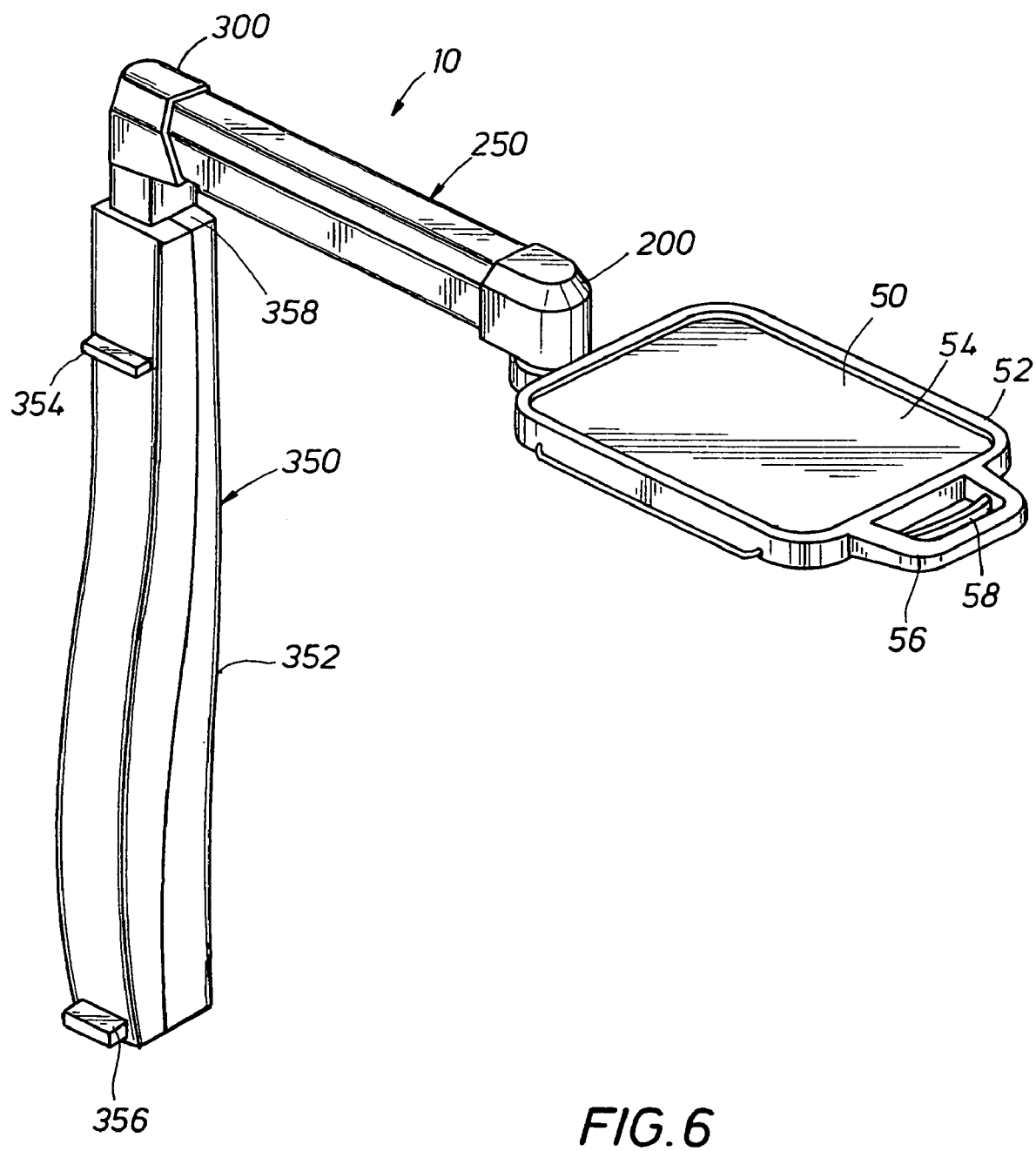
FIG. 6 is a perspective view showing the support column assembly.

As shown in FIG. 6, the tray assembly 50 includes a tray 52, and a tray joint 60 (FIG. 13) which permits the tray to rotate about a vertical axis then lock at the desired position. The tray 52 provides a surface 54 for the temporary storage of instruments, equipment and consumables as well as a mount for tubing and cables, a tray positioning handle 56, and a release handle 58 for unlocking the tray arm.

The tray assembly 50 is mounted to a wrist joint assembly 100 which, in turn, is mounted to a lower arm assembly 150. The lower arm assembly 150 includes a mechanism actuated by a tray tilt control 103 (FIG. 14) which allows the wrist joint 100 to be rotated about a horizontal axis, thus allowing the tray 52 to rotate and be locked into a storage position as shown in FIG. 1. Further the lower arm assembly 150 includes a locking mechanism which transmits the unlocking action to the upper arm assembly 250 as described below.

Figure 21:
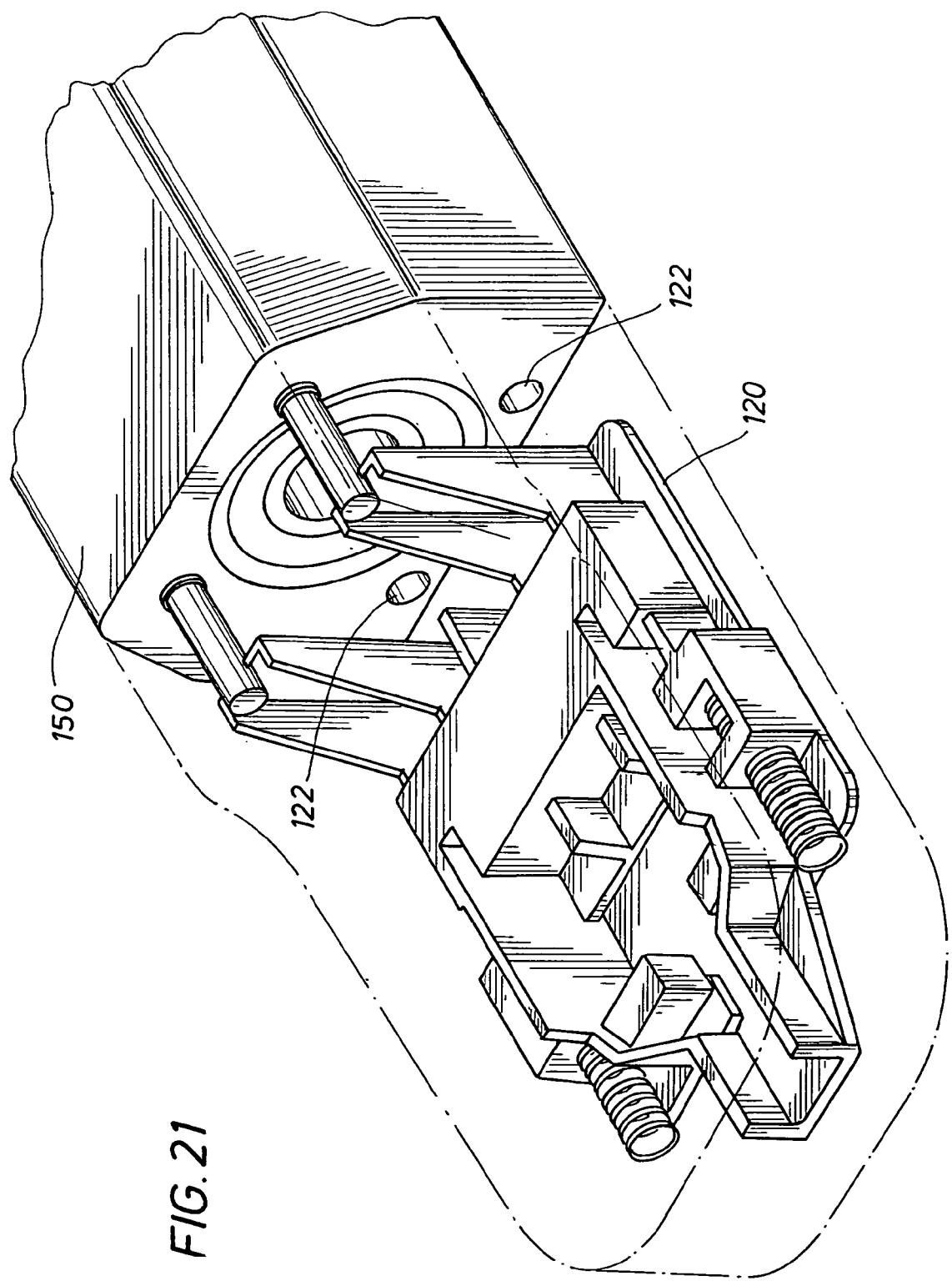
FIG. 21 is a perspective of the connection of the lockable wrist joint to the lower arm assembly.

As shown in FIG. 21, and as will be explained in greater detail below, the wrist joint 100 is locked by a pair of pins that extend from the body of the wrist joint 100 to holes 122 in the lower arm assembly 150. The pins 110 (FIG. 11) are spring loaded and require direct user action to slide a lever which retracts the pins from the holes in the lower arm assembly 150. As shown in FIG. 21, and as will be explained in greater detail below, the wrist joint 100 is unlocked by actuating and holding the release handle 120. After rotation of the wrist 100 is started, and if the release handle 120 is released, wrist rotation is permitted until one of a plurality of locking holes 122 is reached. In the preferred embodiment, the locking holes 122 are positioned about 90° apart.

Mounted to the lower arm assembly 150 is the upper arm assembly 250. The upper arm assembly 250 includes a mechanism which permits the upper arm assembly 250 to rotate about a vertical axis at the shoulder joint 300 and then lock into a position. The lockable shoulder joint 300 also enables rotation about a horizontal axis for storage of the tray arm assembly 10 alongside the console 1000. Further, the upper arm assembly 250 includes a mechanism which permits the lower arm assembly 150 to rotate about a vertical axis at the elbow joint 200 and then lock into position. The upper arm assembly 250 is mounted to a support column assembly 350 which in turn is mounted to the console 1000. Movement of the tray arm assembly 10 from a stored position to an in-use position can be best seen by a sequential review of FIG. 1, FIG. 2 and FIG. 3.

A still better understanding of the tray support arm assembly 10 of the present invention may be had by a more detailed description of its components.

Figure 7:
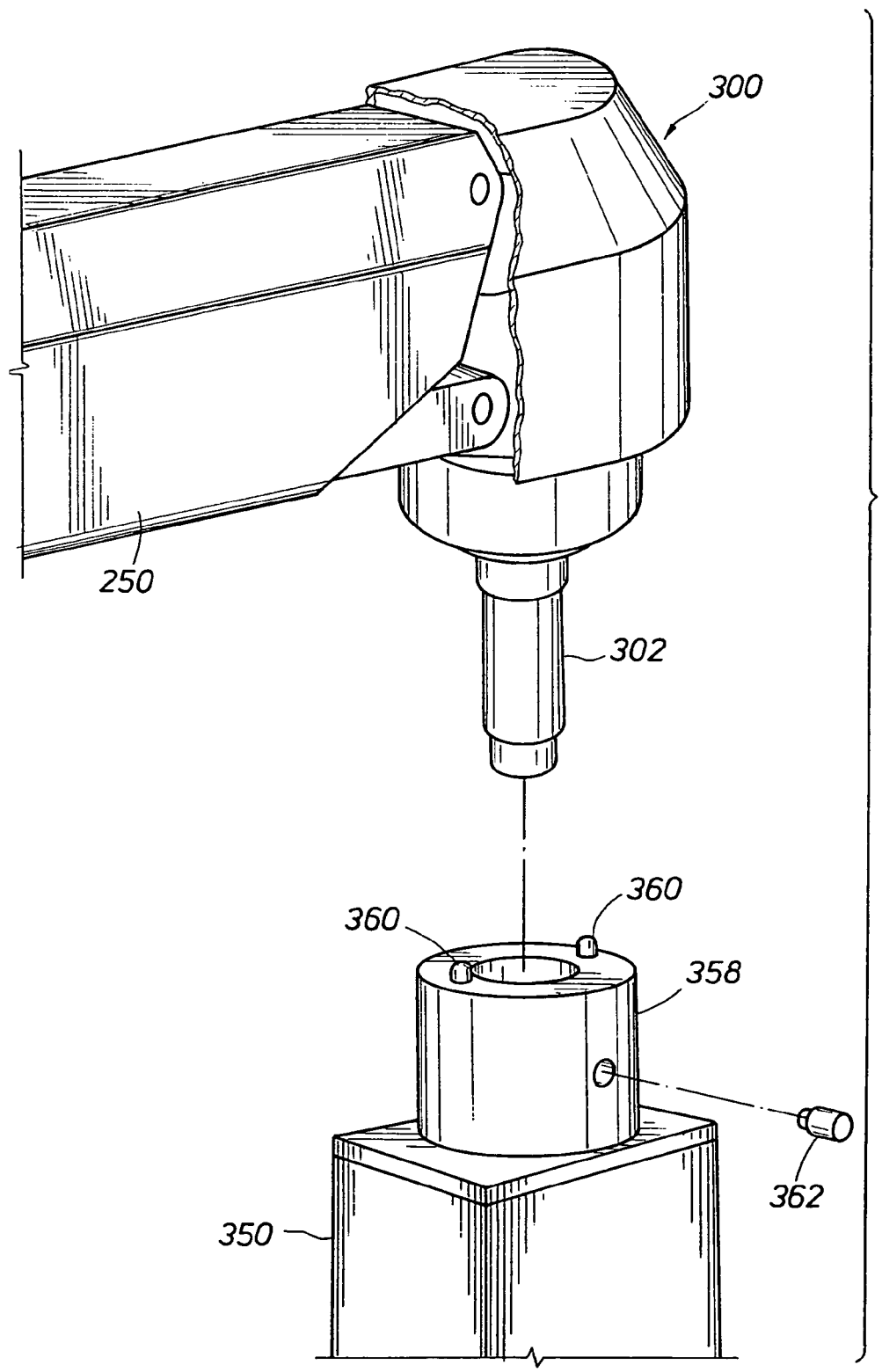
FIG. 7 is a perspective of the mounting of the lockable shoulder joint to the support column assembly.

The tray support arm assembly 10 and its support column assembly 350, shown in FIG. 6, may be mounted to either side of the console 1000. A single support column assembly 350 may be used for mounting to either side of the console 1000. The support column assembly 350 includes a tube 352, an upper bracket 354, a lower bracket 356 and an adaptor 358. As shown in FIG. 7, the adaptor 358 accepts a shaft 302 extending downwardly from the lockable shoulder joint 300. The support column assembly 350 is secured to the base unit 1000 by minimal and easily accessible hardware. Forces from translations along the x, y and z axes are resolved by a shoulder screw used at the upper mounting bracket 354. Rotation about the y axis is resolved by a second shoulder screw located at the upper mounting bracket 354. Rotation about the x and z axes is restrained by a cap screw located at the lower bracket 356.

The shoulder joint 300 connects the upper arm assembly 250 to the support column assembly 350 and provides for rotation about the y axis. The kinematic mounting of the lockable shoulder joint 300 to the adaptor 358 at the top of the support column assembly is shown in FIG. 7. When locked, rotational loading about the y axis is resolved by two pins 360 pressed into the adaptor 358. Rotation about the x axis and the z axis is resolved by the upper and lower ends of the shoulder shaft 302. A set screw 362 is used to prevent the upper arm assembly 250 from moving along the y axis. This single set screw 362 also simplifies the assembly and the disassembly of the upper arm assembly 250 from the support column assembly 350.

Figure 8:
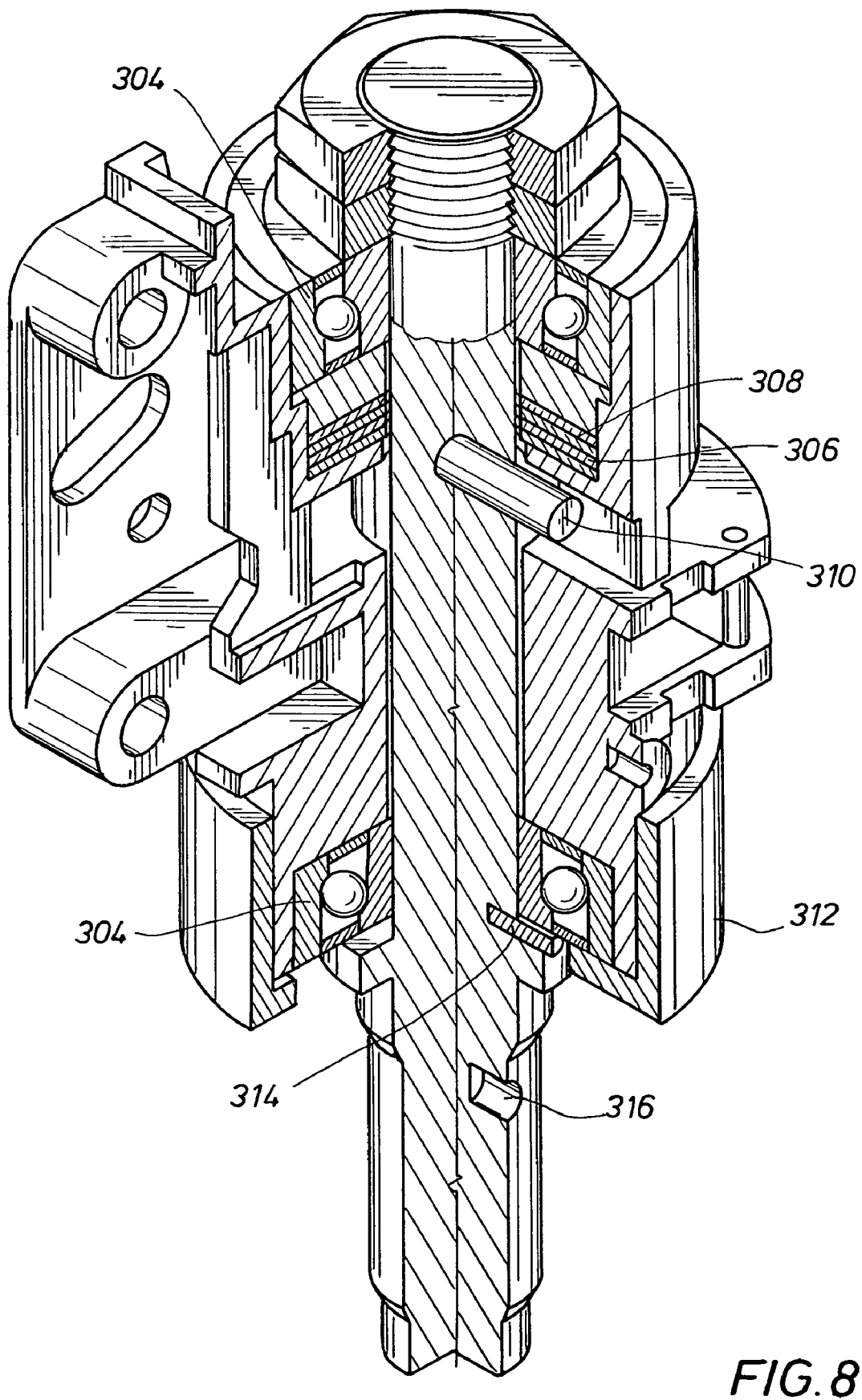
FIG. 8 is a perspective view in partial section of the lockable shoulder joint.

FIG. 8 shows the internal arrangement of the lockable shoulder joint assembly 300. A pair of angular contact bearings 304 mounted in the lockable shoulder joint 300 supports the lockable shoulder joint 300 and permits rotation about the y axis. The angular contact bearings 304, set apart one from another, allow the lockable shoulder joint 300 to handle potentially high radial and axial loads created when a user pushes on the end of a fully extended tray arm when it has been locked into position. Between the angular contact bearings 304 are three discs 306. The three discs 306 include two acetal discs keyed to the body of the lockable shoulder joint 300 and one steel disc keyed to the shaft 302. The three discs 306 are loaded together by Belleville springs 308 to create a light drag torque which restrains the tray support arm assembly 10 against a whipping motion while the arm is unlocked. To maintain a relatively constant drag torque over the life of the tray support arm assembly 10, the Belleville springs 308 are deflected to a near flat condition to take advantage of the lower spring rate portion of the force-deflection curve of the Belleville springs. A pin 310 in the shoulder shaft 302 restricts rotation of the lockable shoulder joint 300 to about 180° thus preventing the upper arm assembly 250 from striking the console 1000. To assure that the tray support arm assembly 10 cannot be mounted on the mounting column assembly 350 out of phase: 1) the pins 360 in the adaptor 358 and the holes in the locking ring 312 at the bottom of the shoulder 300 are different sizes, and 2) the shoulder shaft 302 is keyed 314 to the locking ring 312 to present the tapped hole 316 in the shaft 302 to the outside of the support column assembly 350 for installation of the set screw 362.

Figure 9:
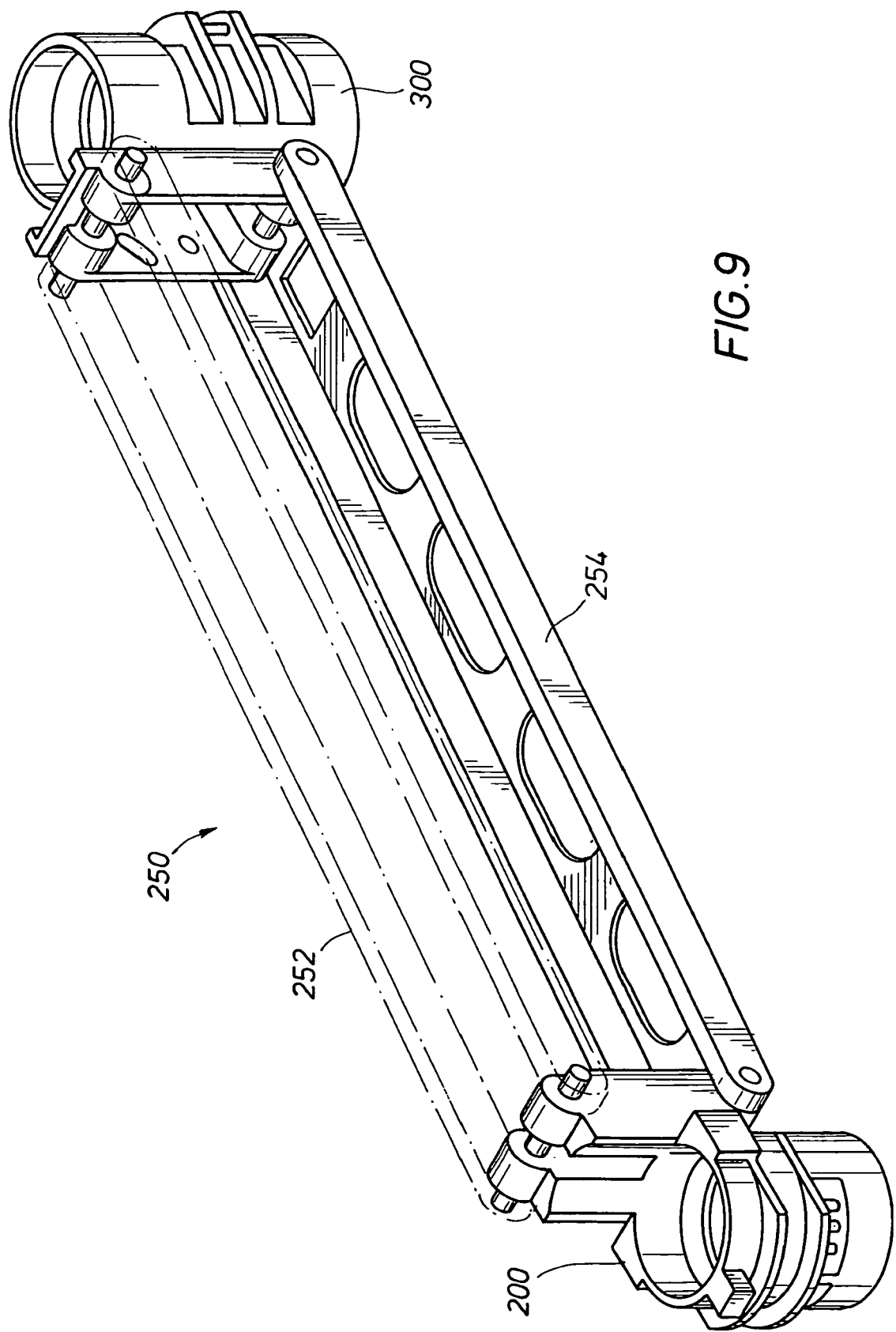
FIG. 9 is a perspective view in partial section of the lockable shoulder joint, the upper arm assembly, and the lockable elbow joint.

As shown in FIG. 9, the lockable shoulder joint 300 and the lockable elbow joint 200 are connected to one another by an upper link 252 and a lower link 254 within the upper arm assembly 250. The lockable shoulder joint 300, the lockable elbow joint 200, the upper link 252 and the lower link 254 create a four bar linkage. The use of a four bar linkage both allows the tray 52 to move up and down and keeps the lower arm assembly 150 substantially horizontally oriented. The upper link 252 shown in FIG. 9, surrounds the lower link 254 and also serves as a cover for the locking and transmission components (not shown). The upper link 252 surrounding the lower link 254 allows for a closed section that supports the torsional loads created when the lower arm assembly 150 is positioned at a right angle to the upper arm assembly 300. The pin interfaces to the links are set as far apart as possible to also increase the stiffness of the tray support arm assembly 10.

Figure 10:
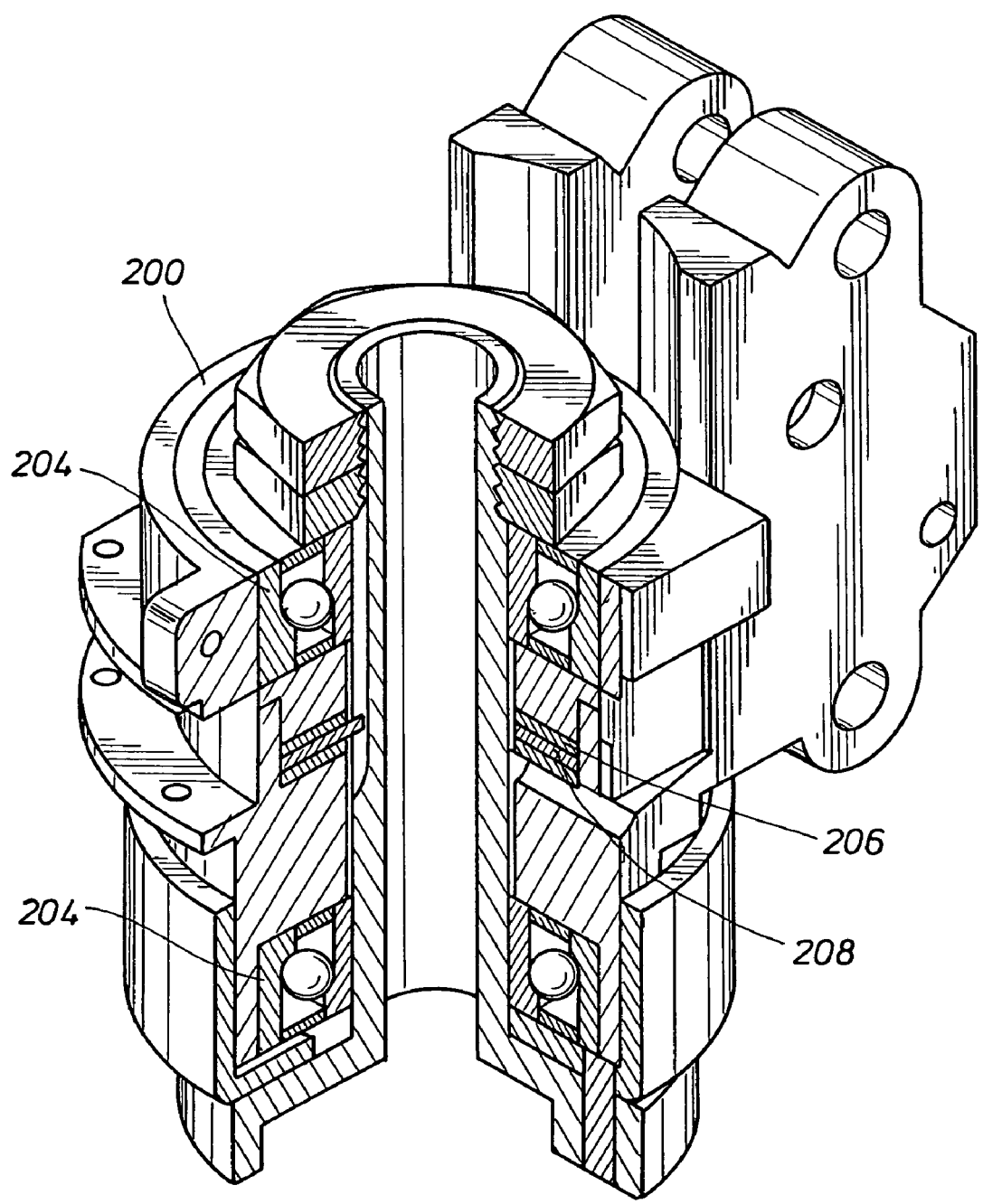
FIG. 10 is a perspective view in partial section of the lockable elbow joint.

The lockable elbow joint 200 is configured similarly to the lockable shoulder joint 300 and serves similar structural purposes as show in FIG. 10. Located within the lockable elbow joint 200 are angular contact bearings 204, friction discs 206 and Belleville washers 208. Specifically, the lockable elbow joint 200 connects the lower arm assembly 150 to the upper arm assembly 250 and allows for rotation of the lower arm assembly 150 about the y axis.

The lower arm assembly 150 and lockable wrist joint 100 provide for the mounting of the tray 52. As shown in FIG. 11, at the end of the lower arm assembly 150 is the lockable wrist joint 100. The lockable wrist joint 100 allows for rotation of the body of the lockable wrist joint 100 about a horizontal z axis with detent positions being located at +90°, 0° and −90°. The wrist joint axle 104 is supported by a dual row bearing 106 and a plain radial bearing 108. This bearing arrangement supports the radial and axial and radial loads imparted to the wrist joint body 100. Torque about the z axis of the lower arm assembly 150 is resolved through the two detent pins 110 which engage holes 122 in the lower arm assembly 150. Translation of the lower arm assembly 150 in the x axis and in the y axis and rotation about the x axis and the y axis are resolved through the axle 104 and the two bearings 106, 108 as shown in FIG. 11. Motion of the lockable wrist joint 100 is limited to ±92° in the preferred embodiment. When rotated, the spacer 112, as shown in FIG. 12, between the bearings 106, 108 that is keyed to the axle 104 will strike the stop 114 attached to the lower arm assembly 150.

Figure 13:
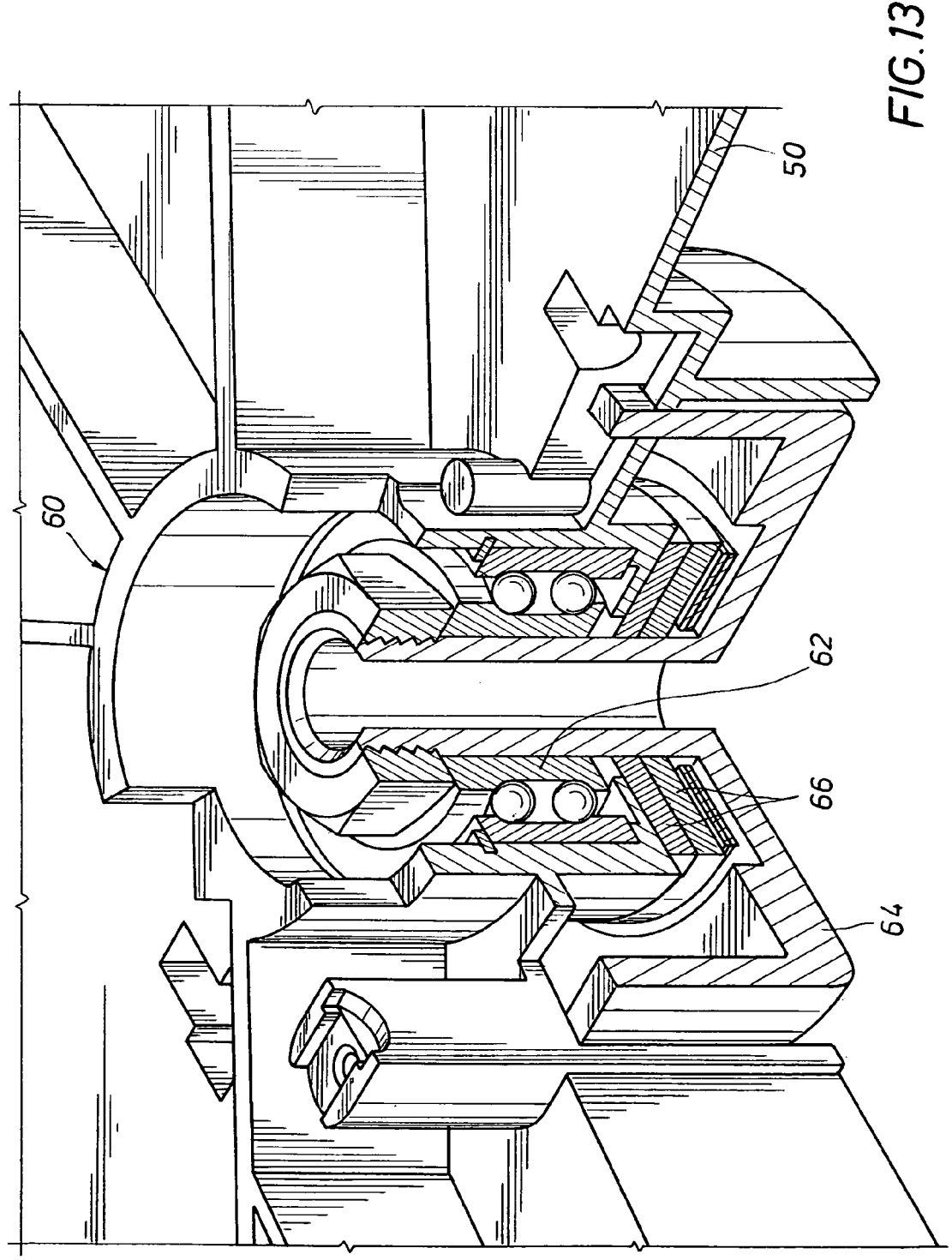
FIG. 13 is a perspective view in partial section of the tray joint assembly.

The tray joint assembly 60 connects the tray 52 to the lower arm assembly 150 and provides for rotation of the tray 52 about the y axis. FIG. 13 illustrates the internal arrangement of the tray joint assembly 60. A dual row bearing 62 mounted in the tray support assembly 50 permits rotation about the y axis. The dual row bearing 62 resolves both radial and axial loads created by a user attempting to move the tray 52 when it is locked in position. Between the tray support assembly 50 and a locking ring attached to the lower arm assembly 150 are two friction discs 66, one acetal and one steel. Two locking rings are loaded against the tray support assembly 50 by wave springs to create a drag torque against whipping of the tray support arm assembly 10 after it has been unlocked. A pin in the locking ring (not shown) restricts rotation of the tray support assembly 50 to about ±70° which prevents the tray support assembly 50 from striking the lower arm assembly 150.

Figure 14:
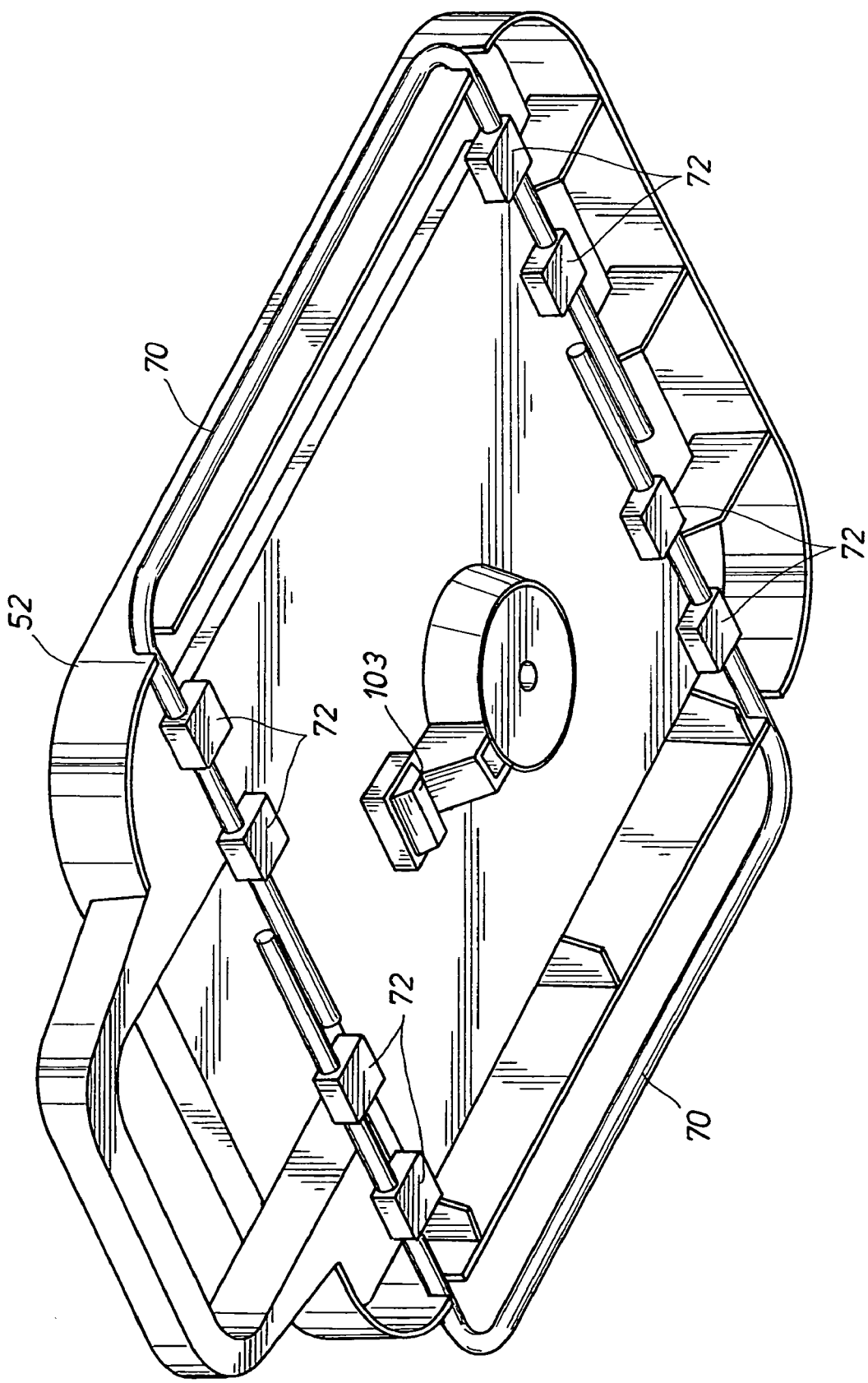
FIG. 14 is a perspective view of the underside of the tray.

The tray support assembly 50 includes the tray 52 and extendable drain bag bars 70 as shown in FIG. 14. The tray 52 and the extendable drain bag bars 70 are mounted in drain bag bar guides 72 on the tray support assembly 50.

The tray support arm assembly 10 is designed to be positioned in any location within its range of motion and remain locked in the selected position until repositioned. The operations required to unlock and reposition the tray support arm assembly 10 are described below.

The positioning of the tray support arm assembly 10 within its range of motion permits the tray 52 to be located in front of the console 1000 for setup and for a surgical procedure such as cataract surgery (FIG. 2) or over the patient for a surgical procedure such as vitreoretinal surgery (FIG. 3). When the console 1000 is not in use, the tray support arm assembly 10 may positioned along the side of the console 1000 for storage as shown in FIG. 1.

Figure 15:
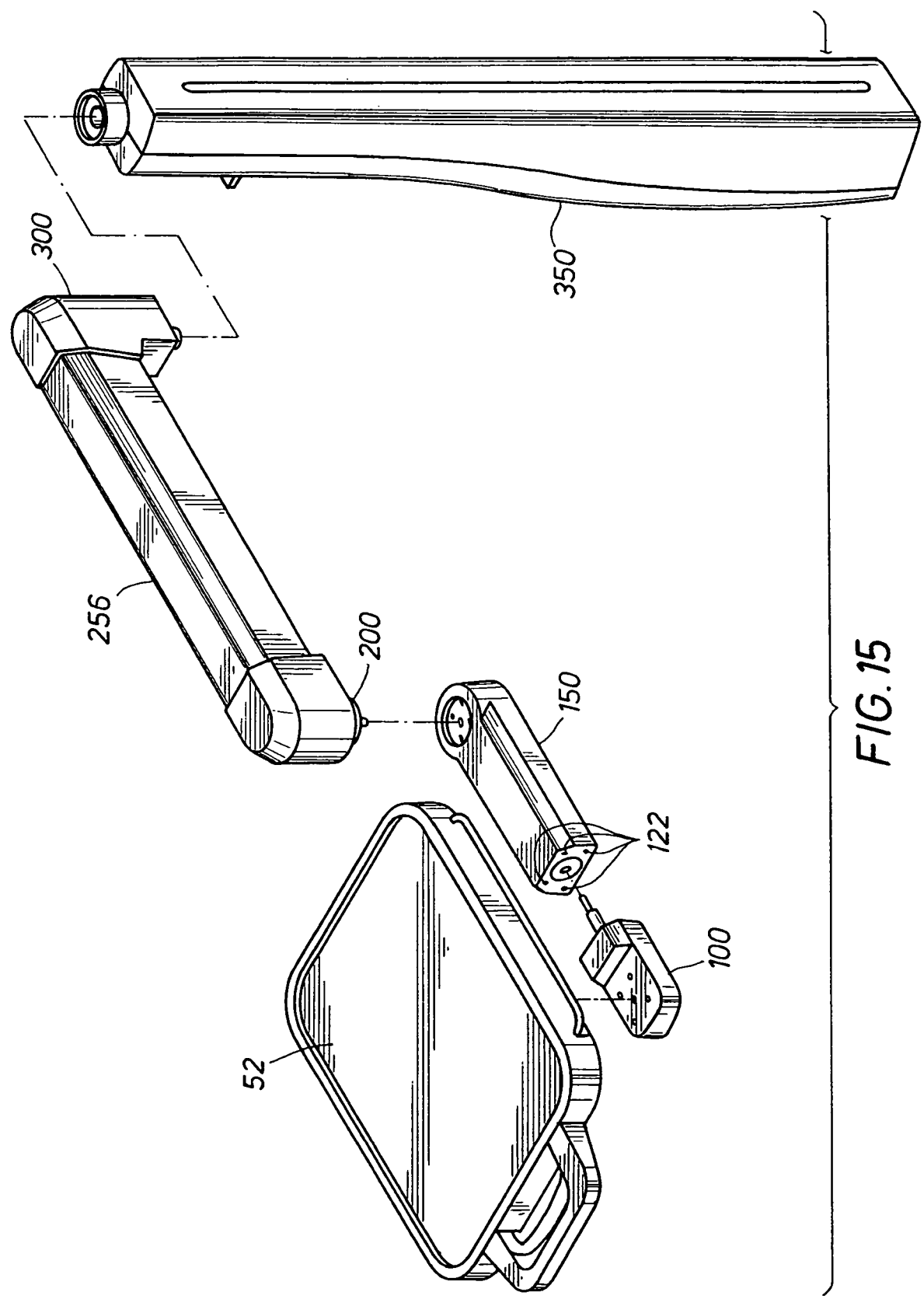
FIG. 15 is an exploded perspective view of the tray support arm assembly.

As best understood by reference to FIG. 15, the enabled movement of the tray support arm assembly 10 is around three vertical axes of rotation and about two horizontal axes of rotation. The lockable shoulder joint 300 vertical axis of rotation in the preferred embodiment is about 180°. The lockable elbow joint 200 vertical axis of rotation is about 360° to reach both the setup and storage positions. When mounted, the elbow joint 200 vertical axis of rotation has a useful range of about 270°. The vertical axis of rotation for lockable tray joint 60 (and thus the tray 52) is about 310°. One of the horizontal axes of rotation is used by the four bar linkage in the upper arm assembly 250 to permit vertical positioning of the tray support arm assembly 10. The upper arm assembly 250 has a range of motion from horizontal to about 41° below horizontal. The range of motion corresponds to a vertical travel of about 13 inches of the tray surface 54. The minimum height of the tray surface 54 is about 35 inches off the floor on which the console 1000 is resting. The second horizontal axis of rotation at the lockable wrist joint 100 allows the tray 52 to be rotated into a position for storage. The second horizontal axis of rotation at the lockable wrist joint 100 has a range of about ±90°. The second horizontal axis of rotation at the lockable wrist joint 100 has locking detents at about 0° and ±90°.

Figure 16:
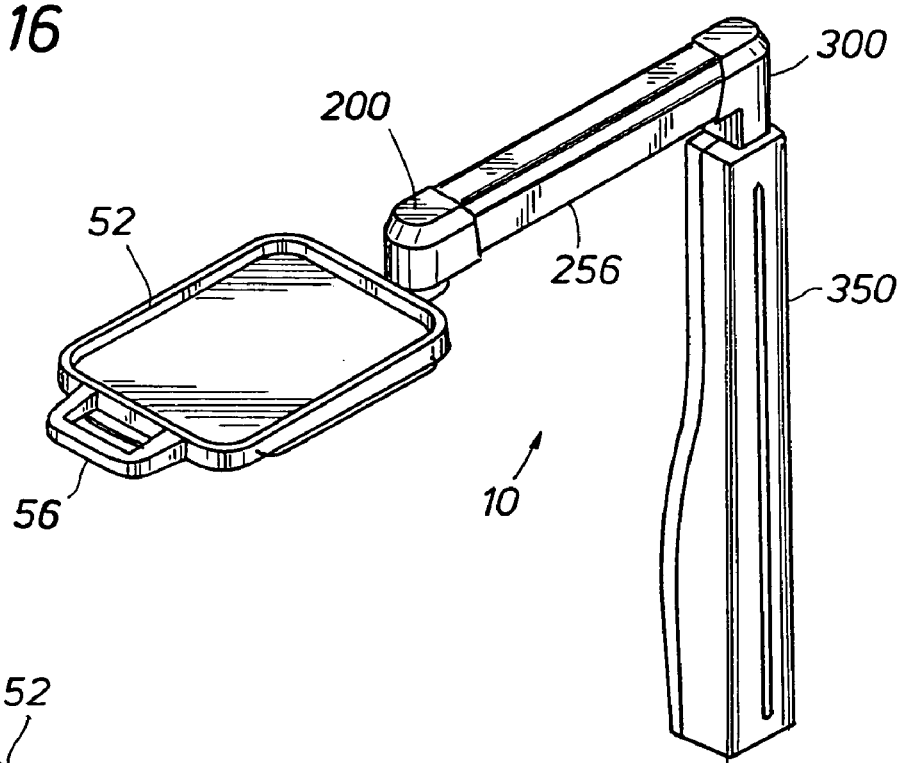
FIG. 16 is a perspective of the tray support arm assembly from above.
Figure 17:
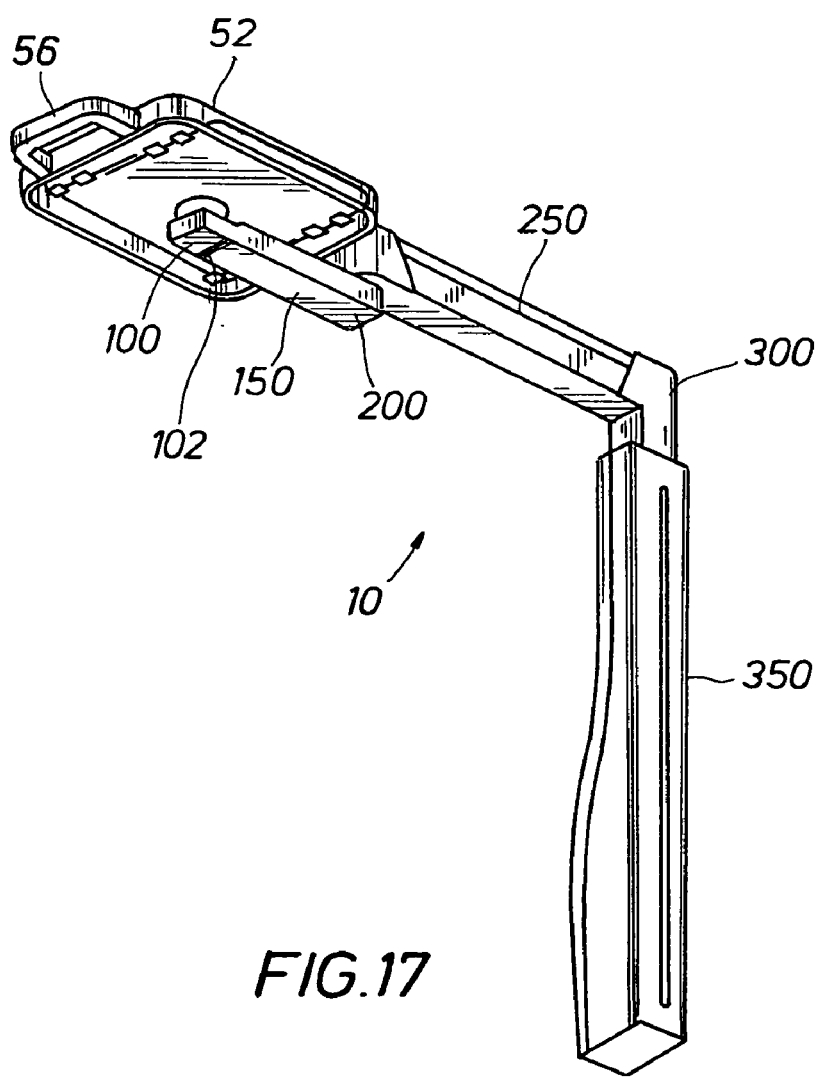
FIG. 17 is a perspective view of the tray support arm assembly from below.

All tray support arm assembly 10 axes are in a normally-locked position. As shown in FIG. 16, these axes are the vertical and horizontal axes at the lockable shoulder joint 300, the vertical axis at the lockable elbow joint 200, the vertical axis at lockable tray joint 60 and the horizontal axes at the lockable wrist joint 100. The second horizontal axis of rotation at the lockable wrist joint 100 is used exclusively for rotating the tray 52 to a position allowing for storage as shown in FIG. 1. The lockable wrist joint 100 has its own tray tilt control 103 as shown in FIG. 14 to release the locking mechanism. The remaining axes are unlocked by actuating and holding the release handle 58 within the tray positioning handle 56 located adjacent to the tray 52. If the release handle 58 is released, no additional motion is permitted.

Figure 18:
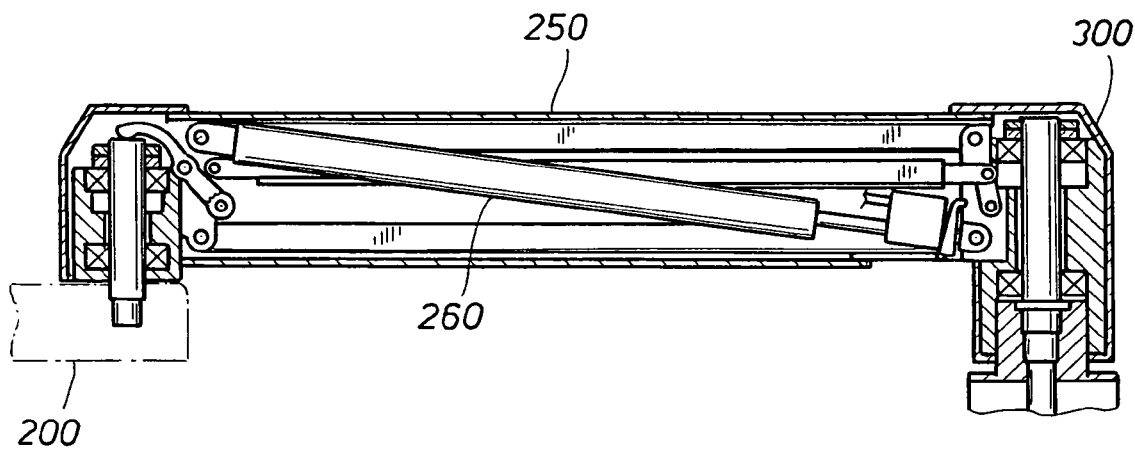
FIG. 18 is a side elevational view in partial section of the upper arm assembly.

As shown in FIG. 18, concerning loading of the tray support arm assembly 10—when unlocked—the weight on the tray arm assembly 10 is compensated for by the action of a locking gas spring 260 that is installed across the four bar linkage of the upper arm assembly 250 as described below. If the release handle 58 is actuated the tray 52 will not fall but rather, the tray 52 will maintain its height. When locked into position; however, there is a load threshold at which the locking gas spring 260 will compress if subjected to a sufficiently high axial load. In the preferred embodiment, this load threshold corresponds to a downward tray load of about 40 to 50 lbs. If the load threshold is exceeded, the tray 52 will move downwardly and then return to its previous position when the load on the tray 52 is removed.

Figure 19:
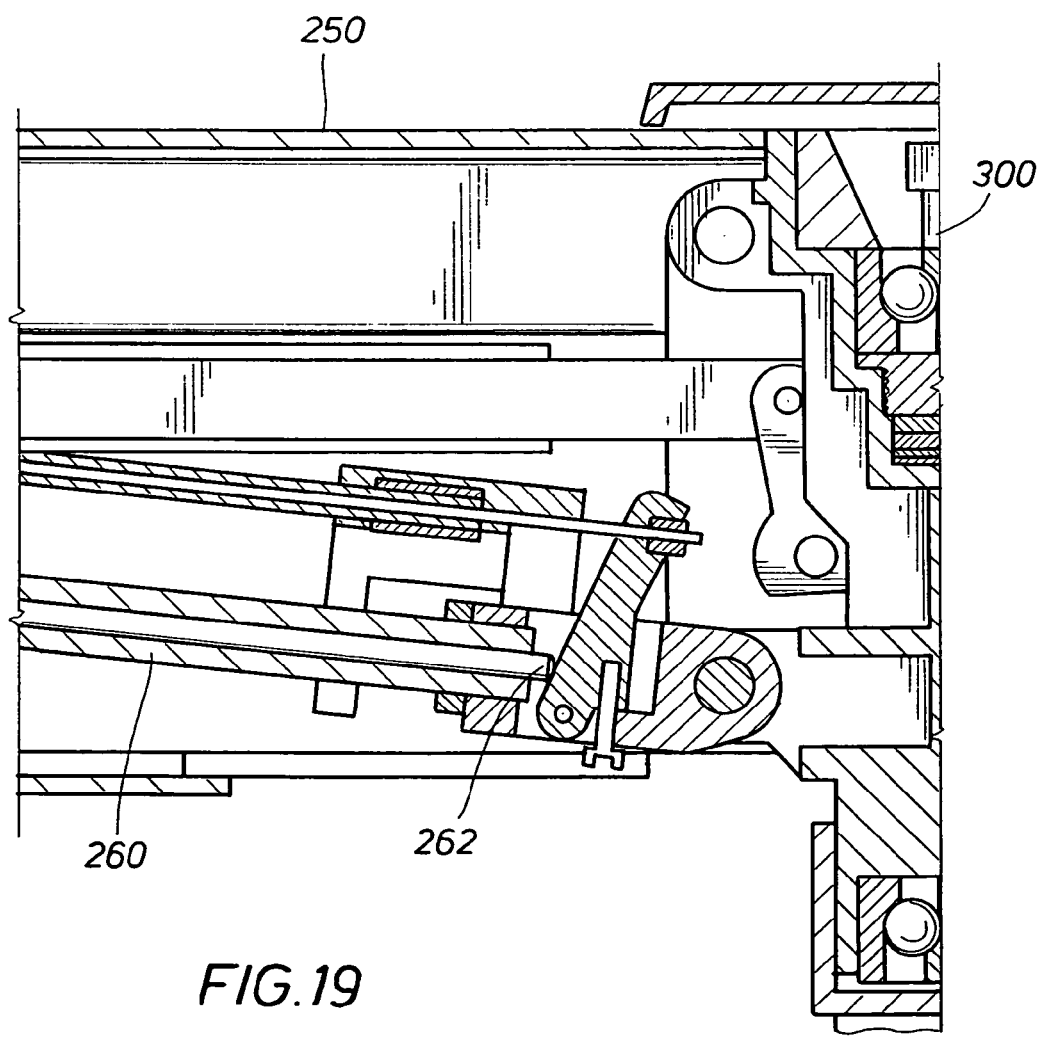
FIG. 19 is an enlarged view in partial section of the lockable shoulder joint.

As previously indicated the position of the tray support arm assembly 10 is horizontally lockable. Specifically, the horizontal elevation axes, and the four pin joints of the four bar linkage are locked into position by the locking gas spring 260. As shown in FIG. 19 at the end of the locking gas spring 260 there is a pin 262 which, if pushed, opens a valve which allows oil contained within the locking gas spring 260 to flow on either side of piston located inside the cylinder portion of the locking gas spring 260. If the pin 262 is not depressed, the valve remains closed. With the valve closed, oil cannot flow and motion of the locking gas spring 260 is prevented due to the incompressibility of the oil. The size of the valve determines the push out rate of the rod portion 270 (FIG. 26) of the locking gas spring 260.

Figure 20:
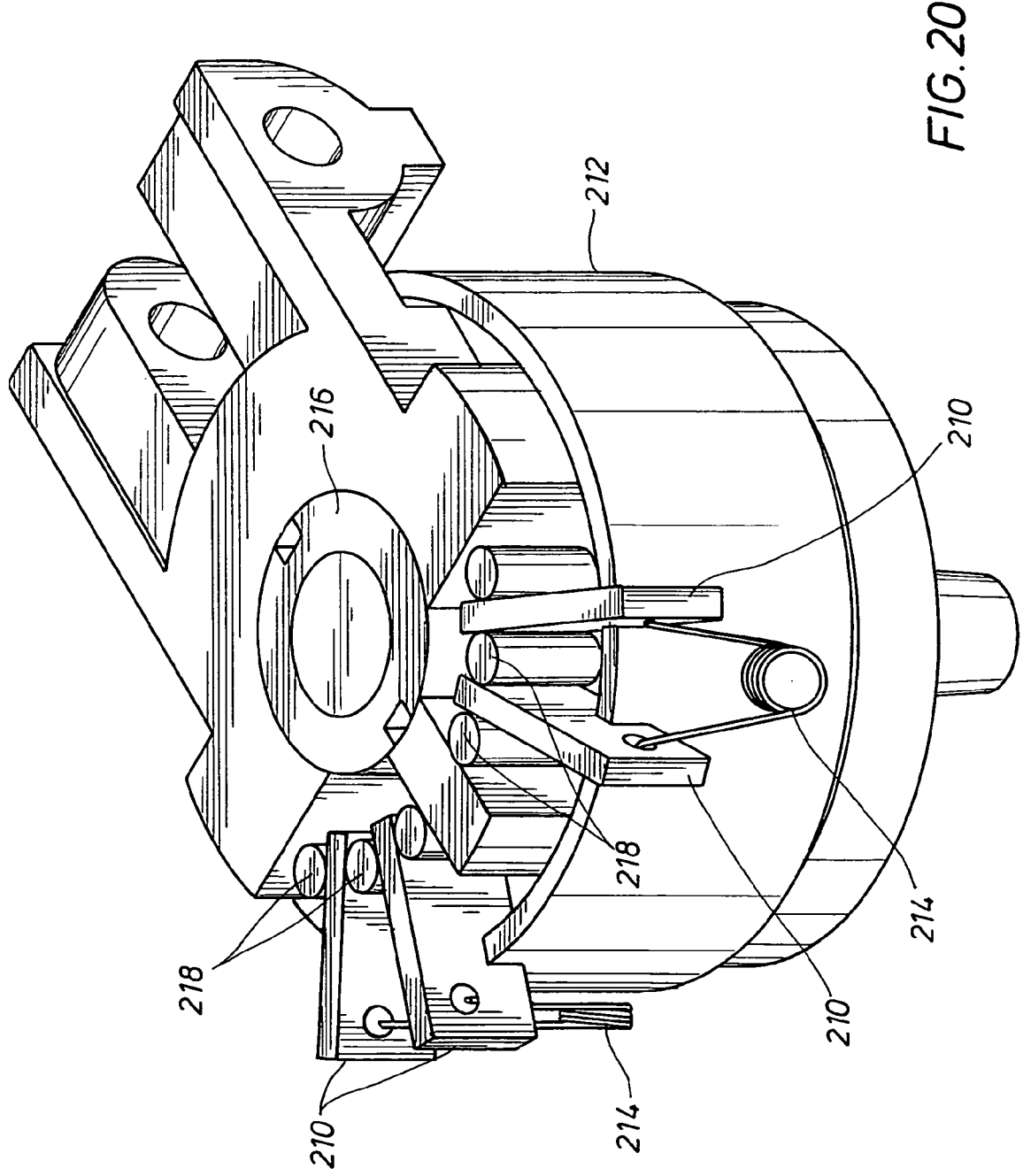
FIG. 20 is a perspective of the interior portion of the lockable elbow joint.

The position of the tray support arm assembly 10 is also vertically lockable. The three vertical positioning axes which are located in the lockable shoulder joint 300, the lockable elbow joint 200 and the lockable tray joint 60 are locked into a position by a sprag type locking mechanism. Each sprag type locking mechanism is infinitely adjustable. Each sprag type locking mechanism is both actuatable and is bidirectional. Further, each sprag type locking mechanism has a very high locking torque and a very low unlocking actuation force. FIG. 20 is a perspective view of the sprag type locking mechanism in the lockable elbow joint assembly 200 with the portion above the sprags removed to reveal the sprag type locking mechanism.

There are two sets of two sprags 210 in the lockable elbow joint assembly 200. For each set of sprags, there is one sprag 210 that prevents clockwise rotation and there is one sprag 210 that prevents counterclockwise rotation. Each sprag set is biased in an outward direction against the locking ring 212 by the bias spring 214. The locking ring 212 is secured to the shaft 216. For the purpose of this description, consider that the shaft 216 is prevented from rotating. As shown in FIG. 20, the sprags 210 prevent rotation of the lockable elbow joint 200. Due to the force from the bias spring 214, the edges of the slot in the sprags 210 engage the locking ring 212 which holds the sprags 210 stationary. If an attempt is made to rotate the lockable elbow joint 200, the bearing pins 218 which are secured to the lockable elbow joint 200 body bear against the stationary sprags 210 so the motion is prevented. The sprags 210 and the locking ring 212 are fabricated from medium carbon steel alloys and are hardened to withstand the high localized stresses experienced when the lockable elbow joint 200 is locked and loaded.

As indicated above the tray support arm assembly 10 permits storage of the tray arm assembly 10 in a storage position along the side of the console 1000. In the locking of the tray support arm assembly 10 in the storage position by a locking assembly 120, the wrist axis is locked by a pair of pins (not shown) that extend from the wrist body into holes 122 located in the lower arm assembly 150 as shown in FIG. 21. The pins are spring loaded and require direct user action to slide a release 103 which retracts the pins. The lockable wrist joint 100 may be unlocked by actuating and holding the release handle 58. After rotation has started, if the release handle 58 is released, rotation is permitted. There are four holes 122, each located 90° apart from one another (FIG. 15), which enable rotation of the tray 52 to four predetermined positions.

As will be understood by those of ordinary skill in the art, a series of mechanical force transmission mechanisms are needed to move the disclosed tray support arm assembly 10. Specifically, the force from the user's actuation of the release handle 58 is distributed to the three vertical rotation locks and the locking gas spring 260 through a series of mechanical force transmission mechanisms.

Figure 22:
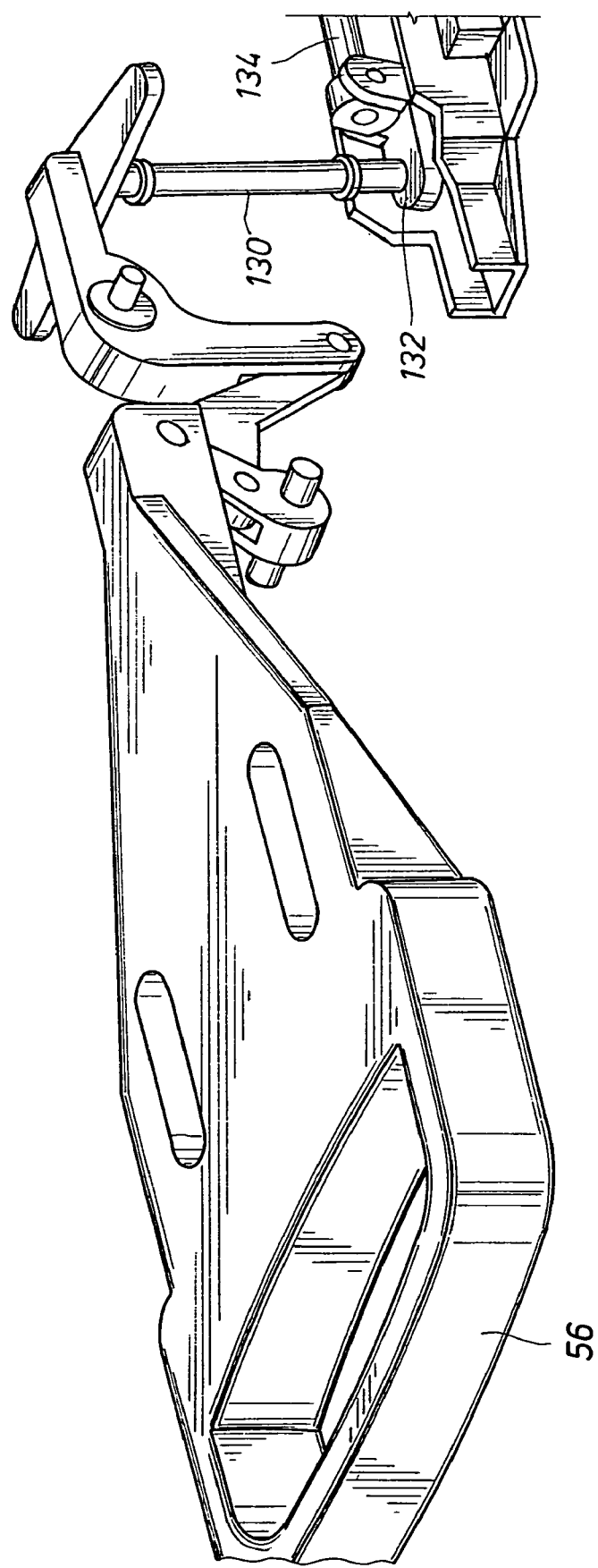
FIG. 22 is a perspective of the connection of the tray joint assembly to the lower arm assembly.

As shown in FIG. 22 the tray unlocking handle 56 is connected through a four bar linkage to a plunger 130 that moves vertically in a shaft through the tray axis. The four bar linkage provides most of the mechanical advantage for unlocking the various locks included in the disclosed tray support arm assembly 10. The plunger 130 serves two purposes. The first purpose of the plunger 130 is to release the sprags in the tray lock. The second purpose of the plunger 130 is to transmit the force and motion through the tray assembly 50 to the other locking mechanisms. The plunger 130 has two tapered pins for releasing the tray locking sprags. As the plunger 130 moves down, each tapered pin bears against an upper edge of a sprag which causes the sprag to rotate which in turn releases the locking ring.

Figure 23:
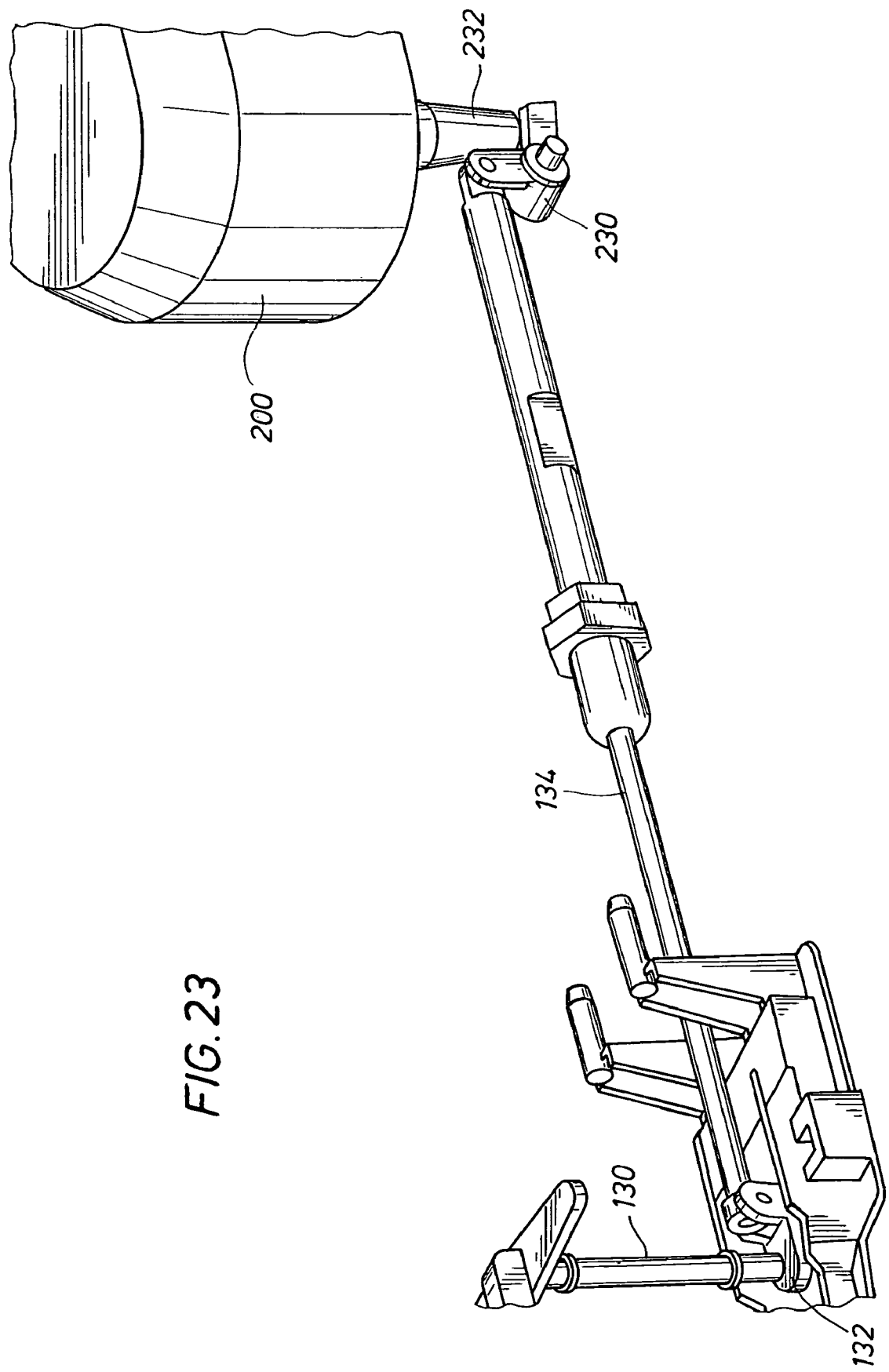
FIG. 23 is a perspective view of the interior of the lower arm assembly.

As shown in FIG. 23, the plunger 130 from the tray assembly 50 presses down on a lever 132 that rotates, pulling on a rod 134 within the lower arm assembly 150. The other end of the rod 134 within the lower arm assembly 150 rotates a second lever 230 that pushes a drive rod 232 up through a shaft in the elbow joint 200. The length of the second lever 230 is set during assembly to assure that the lever cam surfaces are consistently located, one with respect to another, module to module. The setting of the length of the second lever 230 allows the lower arm assembly 150 to be replaceable without having to adjust the joint locks.

Figure 24:
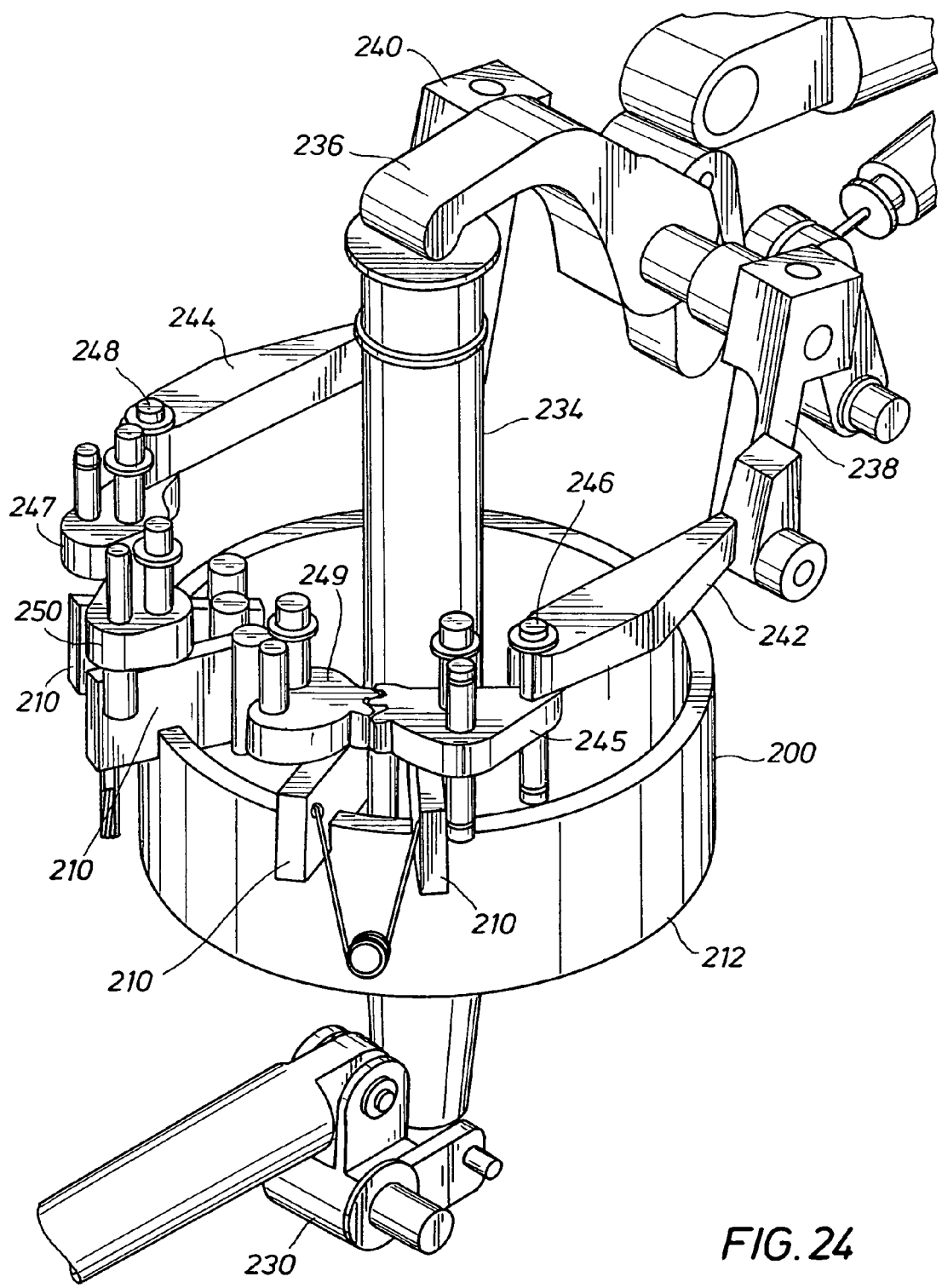
FIG. 24 is a perspective view of the interior of the lockable elbow joint showing the mechanism for the transmission of force therethrough from the lower arm assembly.

As shown in FIG. 24, transmission of forces through the elbow joint 200 is accomplished by the use of a pushrod 234 through the lockable elbow joint 200 which is raised by the second lever 230 which extends into the lower arm assembly 150. The motion of the pushrod 234 causes the main lever 236 to rotate. Herein the motion is transferred onto three paths: the elbow joint assembly sprag release mechanism, the shoulder assembly sprag release mechanism and the gas spring release mechanism.

The elbow joint 200 release mechanism is a mechanical linkage. The main lever 236 rotates two other levers 238, 240, on either side of the lockable elbow joint 200 body. Each lever 238, 240 drives a link 242, 244 against a pin 246, 248 on outboard sprag actuators 245, 247. The outboard sprag actuators 245, 247 rotate inwardly which causes the two outer sprags 210 to release the locking ring 212. Each outboard sprag actuator 245, 247 is engaged with an inboard sprag actuator 249, 250 through a gear mesh. The inboard sprag actuators 249, 250 rotate outwardly which causes the inner sprags 210 to release the locking ring 212.

Figure 25:
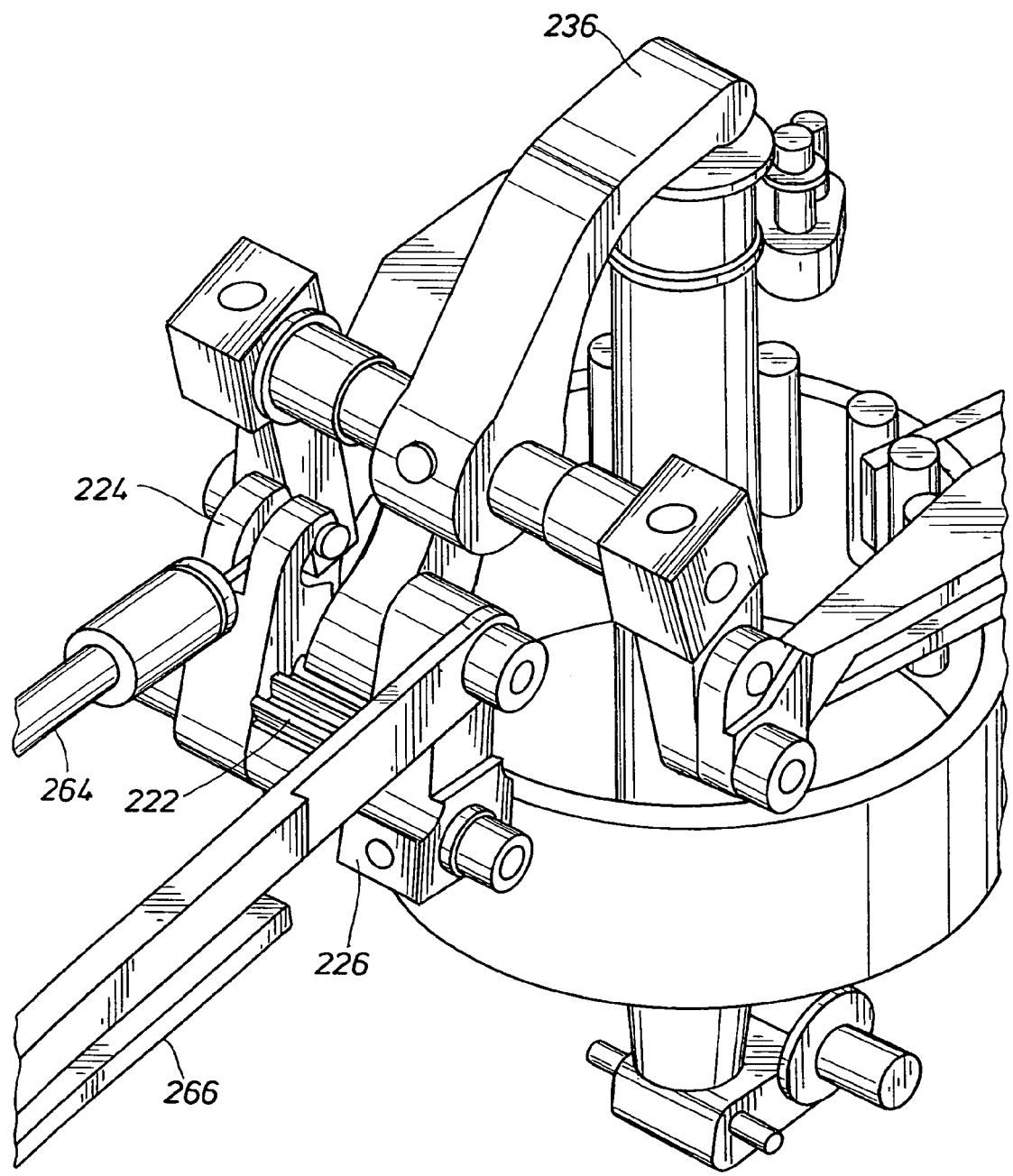
FIG. 25 is a second perspective view of the interior of the lockable elbow joint assembly from the upper arm assembly.

As shown in FIG. 25, the main lever 236 is engaged through a gear sector 222 to two levers 224, 226. One lever 224 pulls on the gas spring release cable 264 and the other lever pulls on the shoulder joint brake release link 266.

Figure 26:
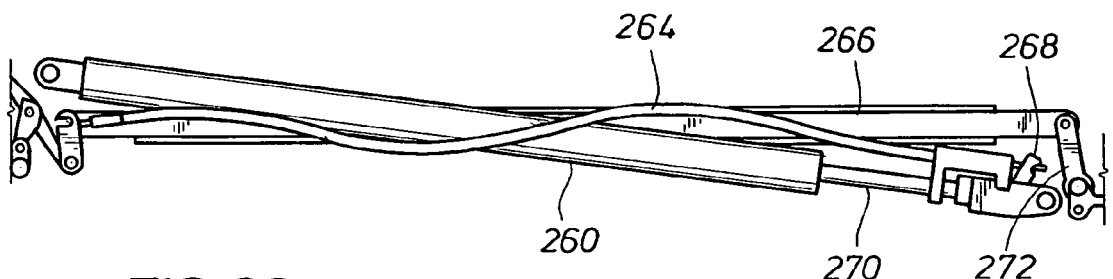
FIG. 26 is a side elevational view of the interior of the upper arm assembly.
Figure 27:
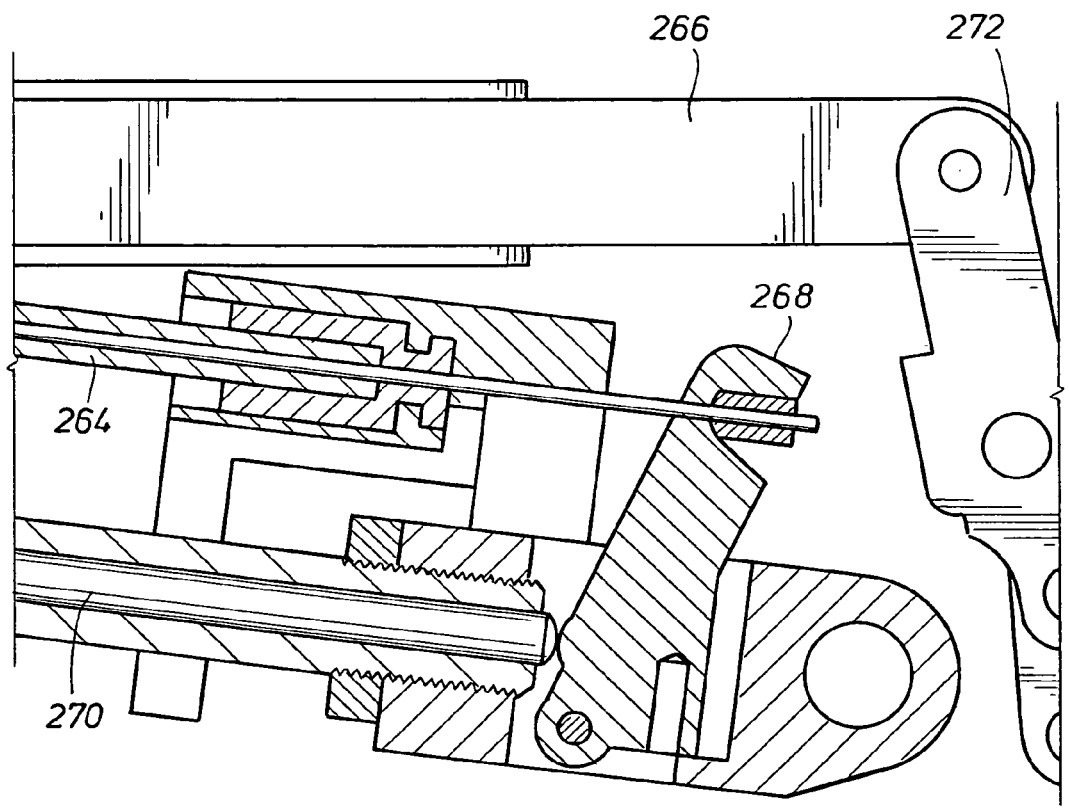
FIG. 27 is an enlarged side elevational view of the lockable shoulder joint end of the upper arm assembly.

As shown in FIG. 26 and in FIG. 27, transmission of force within the upper arm assembly 250 includes a gas spring release cable 264 as described above. The gas spring release cable 264 is connected to a lever 268 in the gas spring release head. The lever 268 pushes on a release pin on the locking gas spring 260, unlocking it and allowing the gas spring rod 270 to move within the cylinder portion of the gas spring. The shoulder joint assembly release link 266 is connected to a lever 272 in the lockable shoulder joint 300.

Figure 28:
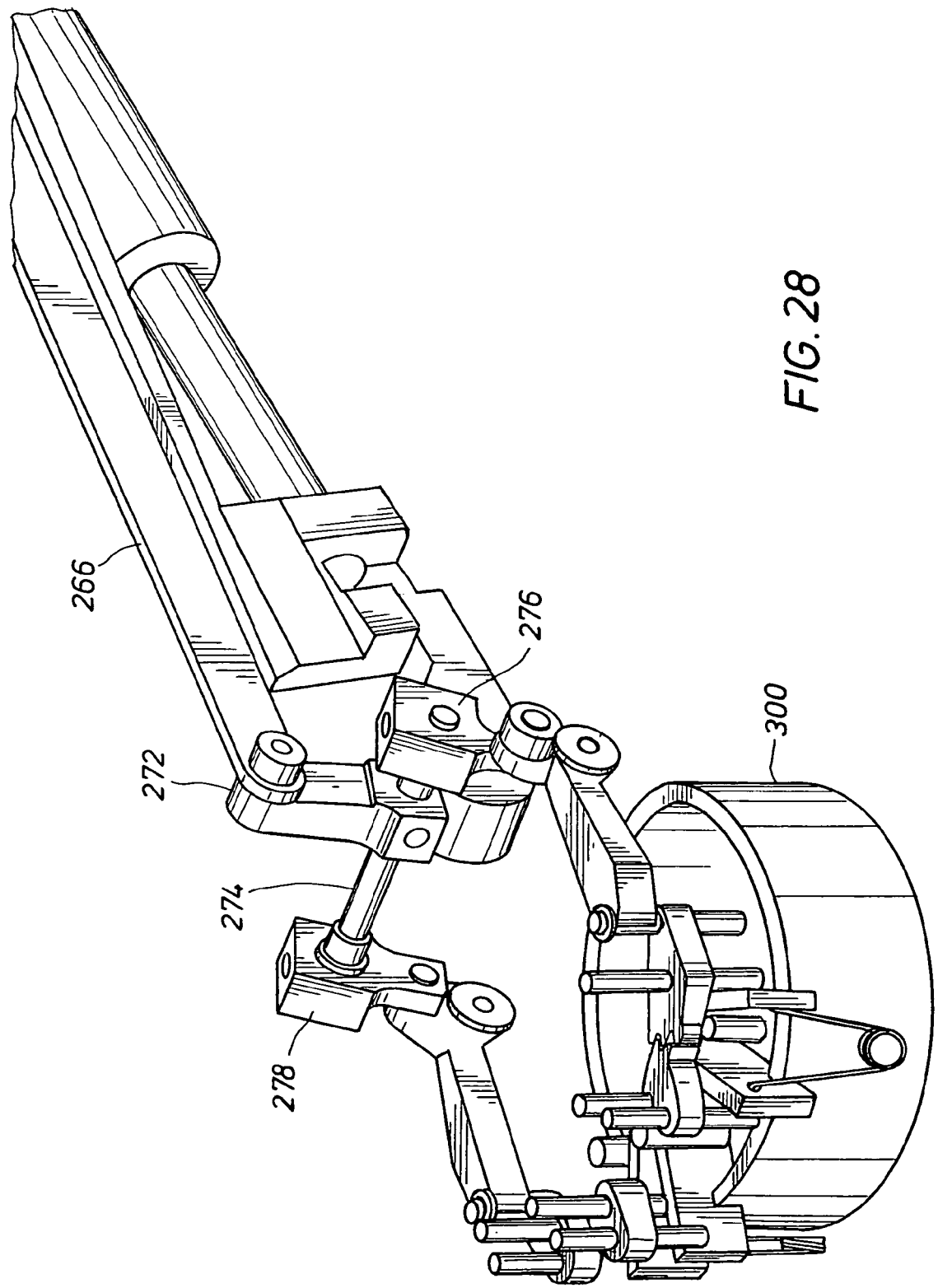
FIG. 28 is a perspective view of the lockable shoulder joint.

As shown in FIG. 27 and in FIG. 28, within the lockable shoulder joint 300, the shoulder joint assembly brake release link 266 is connected to a lever 272. As the brake release link 266 is pulled, the lever 272 and the lever shaft 274 rotate. The rotation of the lever 272 and the lever shaft 274 drives two outboard levers 276, 278 in the same manner as described above for the elbow joint 200. From this point, the sprag release is accomplished the same as for the lockable elbow joint 200.

Operation

To move the tray from one position to another the following steps are followed:

1. The user grasps the tray handle.
2. The user squeezes the release handle to unlock the locks on each axis.
3. The user moves the tray to the desired position.
4. The user releases the grasp on the release handle and the tray handle.

To move the tray from its in-use position to a stored position

1. The user grasps the tray handle.
2. The user actuates the tray tilt control with the other hand to unlock the lock in the wrist joint.
3. The tray is tilted 90°.
4. The user releases the tray tilt control.
5. The release handle is actuated with the hand holding the tray to unlock the locks on the various axes.
6. The user moves the tray to a storage location.
7. The user lets go of the release handle.

To move the tray from a stored position to an in use position.

1. The user grasps the release and the tray handle
2. The user squeezes the release handle.
3. The user moves the tray to a temporary in-use location
4. The user actuates the tray tilt control with the other hand to activate the lock in the wrist joint.
5. The tray is tilted 90°.
6. The user releases the tray tilt control.
7. The user squeezes the tray arm control with the hand that is grasping the tray to unlock the locks on the various axes.
8. The tray is moved to its desired in-use location.
9. The user releases the release handle.

While the disclosed tray support arm assembly has been described according to its preferred embodiment, those of ordinary skill in the art will understand the other embodiments have been enabled by the foregoing disclosure. Such other embodiments shall be included within the scope and meaning of the appended claims.

What is claimed is:

1. A tray support arm assembly comprising:
   a tray assembly, said tray assembly including a lockable tray joint enabling the rotation of said tray assembly about a vertical axis;
   a lockable wrist joint connected to said tray assembly enabling the rotation of said tray assembly about a horizontal axis;
   a lower arm assembly connected to said lockable wrist joint;
   a lockable elbow joint connected to said lower arm assembly enabling the rotation of said lower arm assembly about a vertical axis;
   an upper arm assembly connected to said lockable elbow joint;
   a lockable shoulder joint connected to said upper arm assembly enabling the rotation of said upper arm assembly about a vertical axis and a horizontal axis;
   a locking handle attached to said tray for unlocking said lockable tray joint, said lockable elbow joint and said lockable shoulder joint;
   a tray tilt control for unlocking said lockable wrist in said tray assembly;
   whereby the tray assembly may be oriented in a substantially horizontal orientation for use and a substantially vertical orientation for storage.

2. The tray support arm assembly as defined in claim 1 further including a locking gas spring within said upper arm assembly which bears the weight of the tray support arm assembly.

3. The tray support arm assembly as defined in claim 1 wherein said upper arm assembly further includes an upper link and a lower link which together with said lockable shoulder joint and said lockable elbow joint create a four bar linkage enabling vertical movement of said tray assembly and substantially horizontal positioning of said lower arm assembly.

4. The tray support arm assembly as defined in claim 1 further including a sprag locking system within said lockable tray joint.

5. The tray support arm assembly as defined in claim 1 further including a sprag locking assembly within said lockable elbow joint.

6. The tray support arm assembly as defined in claim 1 further including a sprag locking assembly within said lockable shoulder joint.

7. A tray support arm assembly for mounting to the console portion of a machine, said tray support arm assembly comprising:
   a mounting arm assembly constructed for attachment to the console portion of a machine;
   a lockable shoulder joint connected to said mounting arm assembly;
   an upper arm assembly connected to said lockable shoulder joint;
   a lockable elbow joint connected to said upper arm assembly;
   a lower arm assembly connected to said lockable elbow joint;
   a lockable wrist joint connected to said lower arm assembly;
   a lockable tray rotation joint connected to said lockable wrist joint;
   a tray assembly connected to said lockable tray rotation joint;
   a mechanism passing through said lockable wrist joint, said lower arm assembly, said lockable elbow joint, said upper arm assembly, and said lockable shoulder joint to unlock said lockable tray rotation joint, said lockable elbow joint and said lockable shoulder joint to enable the positioning of said tray assembly in a plurality of substantially horizontal orientations with respect to the console portion of the machine.

8. The tray support arm assembly as defined in claim 7 wherein said upper arm assembly includes a locking gas spring.

9. The tray support arm assembly as defined in claim 8 wherein said upper arm assembly further includes an upper link and a lower link which together with said lockable shoulder joint and said lockable elbow joint create a four bar linkage enabling vertical movement of said tray assembly and substantially horizontal positioning of said lower arm assembly.

10. The tray support arm assembly as defined in claim 7 further including a sprag locking mechanism in said lockable shoulder joint.

11. The tray support arm assembly as defined in claim 7 further including a sprag locking assembly in said lockable elbow joint.

12. The tray support arm assembly as defined in claim 7 further including a sprag locking assembly in said lockable tray rotation joint.

13. The tray support arm assembly as defined in claim 7 wherein said mechanism together with a tray tilt control for unlocking said lockable wrist joint enables the positioning of the tray assembly in a substantially vertical orientation with respect to the console portion of the machine.

14. A method for adjustably positioning a tray support arm near the console of a machine, said method comprising the steps of:
   mounting a support arm assembly to the console of the machine;
   mounting a lockable shoulder joint to said support arm assembly, said lockable shoulder joint enabling rotation about a horizontal axis and a vertical axis;
   mounting an upper arm assembly to said lockable shoulder joint;
   mounting a lockable elbow joint to said upper arm assembly, said lockable elbow joint enabling rotation about a vertical axis;
   mounting a lower arm assembly to said lockable elbow joint;
   mounting a lockable tray assembly to said lower arm assembly, said lockable tray assembly enabling rotation about a vertical axis;
   mounting a tray to said lockable tray assembly.

15. The method as defined in claim 14 wherein the weight of said tray, said lockable tray assembly, said lower arm assembly, said lockable elbow joint, and said upper arm assembly is supported in part by a locking gas cylinder within said upper arm assembly.

16. The method as defined in claim 14 further including the step of mounting a lockable wrist joint to said lockable tray assembly and said lower arm assembly, wherein a rotation of said lockable shoulder joint and said lockable wrist joint about a horizontal axis are used when placing said tray support arm in a storage position alongside the console of the machine.

* * * * *